US007809742B2

(12) United States Patent
Kagaya

(10) Patent No.: US 7,809,742 B2
(45) Date of Patent: Oct. 5, 2010

(54) CONTENT MANAGEMENT METHOD, APPARATUS, AND SYSTEM

(75) Inventor: Naoto Kagaya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 571 days.

(21) Appl. No.: 11/733,288

(22) Filed: Apr. 10, 2007

(65) Prior Publication Data

US 2007/0255710 A1 Nov. 1, 2007

(30) Foreign Application Priority Data

May 1, 2006 (JP) ............................ 2006-127883

(51) Int. Cl.
*G06F 7/24* (2006.01)

(52) U.S. Cl. ...................................................... 707/758

(58) Field of Classification Search .................. 707/758
See application file for complete search history.

(56) References Cited

U.S. PATENT DOCUMENTS 6,449,645 B1 * 9/2002 Nash .......................... 709/224
2006/0122986 A1 * 6/2006 Sohma .......................... 707/3

FOREIGN PATENT DOCUMENTS

| | | |
|---|---|---|
| JP | 09-223130 | 8/1997 |
| JP | 2004-234158 | 8/2004 |
| JP | 2005-063144 | 3/2005 |

* cited by examiner

*Primary Examiner*—James Trujillo
*Assistant Examiner*—Fatima P Mina
(74) *Attorney, Agent, or Firm*—Fitzpatrick, Cella, Harper & Scinto

(57) ABSTRACT

Upon receiving a notification from a device that a content configuration changed, a management apparatus that manages one or more devices searches among contents possessed by the device in question for a content for which first identification information recorded in a second area and in a first area of attendant information of the content differ, and determines whether second identification information recorded in a second area of the attendant information of the retrieved content is unique among all contents in the system. When the management apparatus determines that second identification information of the attendant information is not unique, it updates the first identification information recorded in the second area of the attendant information with first identification information recorded in the first area of the attendant information and updates the second identification information with identification information that is unique in the system, to thereby update the attendant information of the content.

9 Claims, 19 Drawing Sheets

FIG. 6

```
     <DIDL-Lite xml:lang=...>
         <item id=1 parentID=10 restricted=... refID=...>
                   <dc:title>...</dc:title>
                   <upnp:class>...</upnp:class>
                   <dc:creator>...</dc:creator>
                   <upnp:writeStatus>...</upnp:writeStatus>
                   <dc:...>...</dc:...>
                   <upnp:...>...</upnp:...>
                   <desc:...>...</desc:...>
                   <res:...>...</res:...>
         </item>
601~     <item id=2 parentID=10 restricted=... refID=...>
                   ...
         </item>
         <item id=3 parentID=10 restricted=... refID=...>
                   ...
         </item>
602~     <container id=100 restricted=... parentID=10 searchable=... childCount=5>
                   <dc:title>...</dc:title>
                   <upnp:class>...</upnp:class>
                   <upnp:searchClass>...<upnp:searchClass>
                   <desc> ... <desc>
         </container>
         <container id=101 restricted=... parentID=10 searchable=... childCount=7>
                   ...
         </container>
     </DIDL-Lite>
```

FIG. 15

| FUNCTION COMMAND | OPERATION DETAILS |
|---|---|
| GetSystemUpdateID | Command used at time of notifying content list change |
| Browse | Content browse command |
| Search | Content search command |
| CreateObject | Item (metadata) creation command |
| DestoryObject | Item (metadata) deletion command |
| UpdateObject | Item (metadata) change command |
| ImportResource | Content transfer (input) command |
| ExportResource | Content transfer (output) command |
| DeleteResource | Content deletion command |

CONTENT MANAGEMENT METHOD, APPARATUS, AND SYSTEM

BACKGROUND OF THE INVENTION

1. Field of the Invention

The present invention relates to content management technology for collectively managing a plurality of contents in a device configuration that is connected by a network.

2. Description of the Related Art

In recent years, in addition to personal computers (PCs) and dedicated storage devices, devices equipped with a function that stores content data (hereunder, referred to simply as "content") have become widely available. Examples of this kind of device include a camera that has a function that stores captured image content or a disk recorder that stores broadcast content and the like. Further, accompanying the widespread use of networks, environments in which devices such as those described above are connected by a network are also becoming common. In this kind of environment, sharing of data processing functions and mutual sending and receiving of content is enabled by communication between a plurality of devices, thereby enhancing the convenience of the devices.

A standard communications protocol called "universal plug and play (UPnP)" is becoming widely used in such cases to realize operations and notification of abilities between the plurality of devices. Further, standard communications protocols such as digital living network alliance (DLNA) that is an extension of universal plug and play (UPnP) are also in widespread use. For these kinds of communications protocols, a system called "content directory service (CDS)" exists that manages the stored content and sends the information thereof to the outside.

In a configuration that utilizes a communications protocol as described above, an apparatus that has a storage function operates as a content server that provides content stored inside the apparatus. The content stored in the content server can be utilized from an arbitrary operation terminal without depending on the apparatus or OS. That is, the content server manages a list of the stored content (content list), and discloses this list to the operation terminal to make it possible to refer to the content managed in the server from the outside. Further, the operation terminal can perform an operation to, for example, display, playback, edit, duplicate, move, or search the content stored inside each content server.

When performing an operation with respect to the content as described above, in most cases the operation terminal utilizes metadata in accordance with the above described communications protocol that is appended to the content. Therefore, when moving the content or the like, it is always necessary to append metadata to the content. Each content server issues an identifier (hereunder, ID) in accordance with the above described communications protocol for the stored content, and assigns this ID to the aforementioned metadata to carry out management of the metadata. It is also possible to refer to this metadata from the content list that each content server makes publicly available.

However, in the content (and metadata) management forms as described above, when content is moved between content servers the ID of the content is changed even though the content remains the same. This is because each content server uniquely assigns an ID that is unique to the content server in question to the stored content. When the ID of the content is changed in this manner, it is sometimes not possible to retrieve the desired object in a search operation from an operation apparatus.

To solve the above-described problem, systems have been proposed that manage content by embedding a unique ID (hereunder, referred to as "GUID" (Global Unique ID)) in metadata inside the system. For example, Japanese Patent Laid-Open No. 2004-234158 proposes a system that collectively manages content by each content server adding and embedding a GUID in a unique region of metadata, and then maintaining that GUID even when the content is moved. Further, Japanese Patent Laid-Open No. 2005-063144 proposes a system in which an attribute assigning apparatus assigns a GUID when a user requests the attribute assigning apparatus to register content using a dedicated operation terminal. Furthermore, Japanese Patent Laid-Open No. 9-223130 proposes a data management system in which, with regard to assignment of a GUID, when a dedicated operation apparatus notifies a dedicated management apparatus of the details of an operation with respect to content, the dedicated management apparatus assigns a GUID in accordance with the notified operation.

However, there are the following problems in the above described prior art.

(1) In a case of following the aforementioned communications protocol, when performing an operation such as duplication or movement of content between arbitrary content servers from an arbitrary operation apparatus, there is no means that notifies the content for which the operation was performed or the operation details to the other content server. Therefore, even when an apparatus other than the content server that performed the operation attempts to uniquely manage all the content in the system, the apparatus cannot recognize the details of the operation. Therefore, the apparatus cannot uniquely assign a GUID in accordance with the operation details.

(2) When assigning a GUID only to content inside the own device, as in Japanese Patent Laid-Open No. 2004-234158, it is not possible to manage content within a content server that does not have the ability to assign an arbitrary GUID.

(3) Since the handling of a GUID is the same when content is copied and when content is moved, in the case of performing a search, different content is duplicated and retrieved, and thus the uniqueness of content cannot be preserved.

(4) When performing an operation in accordance with the above described communications protocol, unless the management terminal holds the metadata of all the content and searches all the content in the system each time an operation is performed, the management terminal cannot recognize for which content an operation was performed.

SUMMARY OF THE INVENTION

The present invention was made in view of the above described problems, and provides a content management apparatus, method, and system that can maintain the consistency of content identification information even when a content operation such as copying or movement occurs in a content management system having a plurality of content servers.

According to one aspect of the present invention a managing apparatus adapted to manage a content that is possessed by a device in a system including one or more devices, wherein, to each content is attached attendant information having a first area in which a device that possesses the content in question records a first identification information for uniquely identifying the content and a second area in which the managing apparatus records a second identification information for uniquely identifying the content in the system and the first identification information that is recorded in the first area;

the managing apparatus comprising:

a first search unit adapted to, upon receipt of a notification from a device to the effect that a content configuration is changed, search for a content for which the first identification information that is recorded in the first area and the second area, respectively, of the attendant information are different from among contents that are possessed by the device in question;

a determination unit adapted to determine whether or not the second identification information that is recorded in the second area of the attendant information of a content that is searched for and retrieved by the first search unit is unique among content in the system; and an update unit adapted to, when the determination unit determines that the second identification information of the attendant information of the content that is retrieved is not unique, update the first identification information that is recorded in the second area of the attendant information with the first identification information that is recorded in the first area of the attendant information, and update the second identification information to identification information that is unique in the system.

According to another aspect of the present invention a managing system in which one or more devices and a managing apparatus are communicably connected and a content possessed by a device is managed by the managing apparatus, wherein, to each content is attached attendant information having a first area in which a device that possesses the content in question records a first identification information for uniquely identifying the content and a second area in which the managing apparatus records a second identification information for uniquely identifying the content in the system and the first identification information that is recorded in the first area;

the managing apparatus comprising:

a first search unit adapted to, upon receipt of a notification from a device to the effect that a content configuration is changed, search for a content for which the first identification information that is recorded in the first area and the second area, respectively, of the attendant information are different from among contents that are possessed by the device in question;

a determination unit adapted to determine whether or not the second identification information that is recorded in the second area of the attendant information of a content that is searched for and retrieved by the first search unit is unique among contents in the system; and an update unit adapted to, when the determination unit determines that the second identification information of the attendant information of the content that is retrieved is not unique, update the first identification information that is recorded in the second area of the attendant information with the first identification information that is recorded in the first area of the attendant information, and update the second identification information to identification information that is unique in the system.

According to still another aspect of the present invention a method of managing a content possessed by a device in a system that includes one or more devices, wherein, to each content is attached attendant information having a first area in which a device that possesses the content in question records a first identification information for uniquely identifying the content, and a second area in which the managing apparatus records a second identification information for uniquely identifying the content in the system and the first identification information that is recorded in the first area;

the method comprising:

a first search step of, when a notification to the effect that a content configuration is changed is received from a device, searching for a content for which the first identification information that is recorded in the first area and the second area, respectively, of the attendant information are different from among contents that are possessed by the device in question;

a determination step of determining whether or not the second identification information that is recorded in the second area of the attendant information of a content that is searched for and retrieved in the first search step is unique among contents in the system; and an update step of, when it is determined in the determination step that the second identification information of the attendant information of the content that is retrieved is not unique, updating the first identification information that is recorded in the second area of the attendant information using the first identification information that is recorded in the first area of the attendant information, and updating the second identification information to identification information that is unique in the system.

Further features of the present invention will become apparent from the following description of exemplary embodiments (with reference to the attached drawings).

BRIEF DESCRIPTION OF THE DRAWINGS

FIG. 6 is a view showing a description example of a content list according to the embodiment;

FIG. 15 is a view showing function commands and operation details for DLNA.

DESCRIPTION OF THE EMBODIMENTS

Preferred embodiments of the present invention will now be described in detail in accordance with the accompanying drawings.

In this embodiment, a description is given that uses as an example a system comprising a management apparatus that is connected with a wireless LAN as well as a plurality of content servers that are connected with the wireless LAN. In this connection, a content server is an apparatus that stores and manages content, and examples thereof include a camera device, a video imaging apparatus, a PC apparatus, and a broadcast content recording/playback apparatus. Further, in the present embodiment the management apparatus is an independent apparatus from the operation apparatus and the content server.

Figure 1:
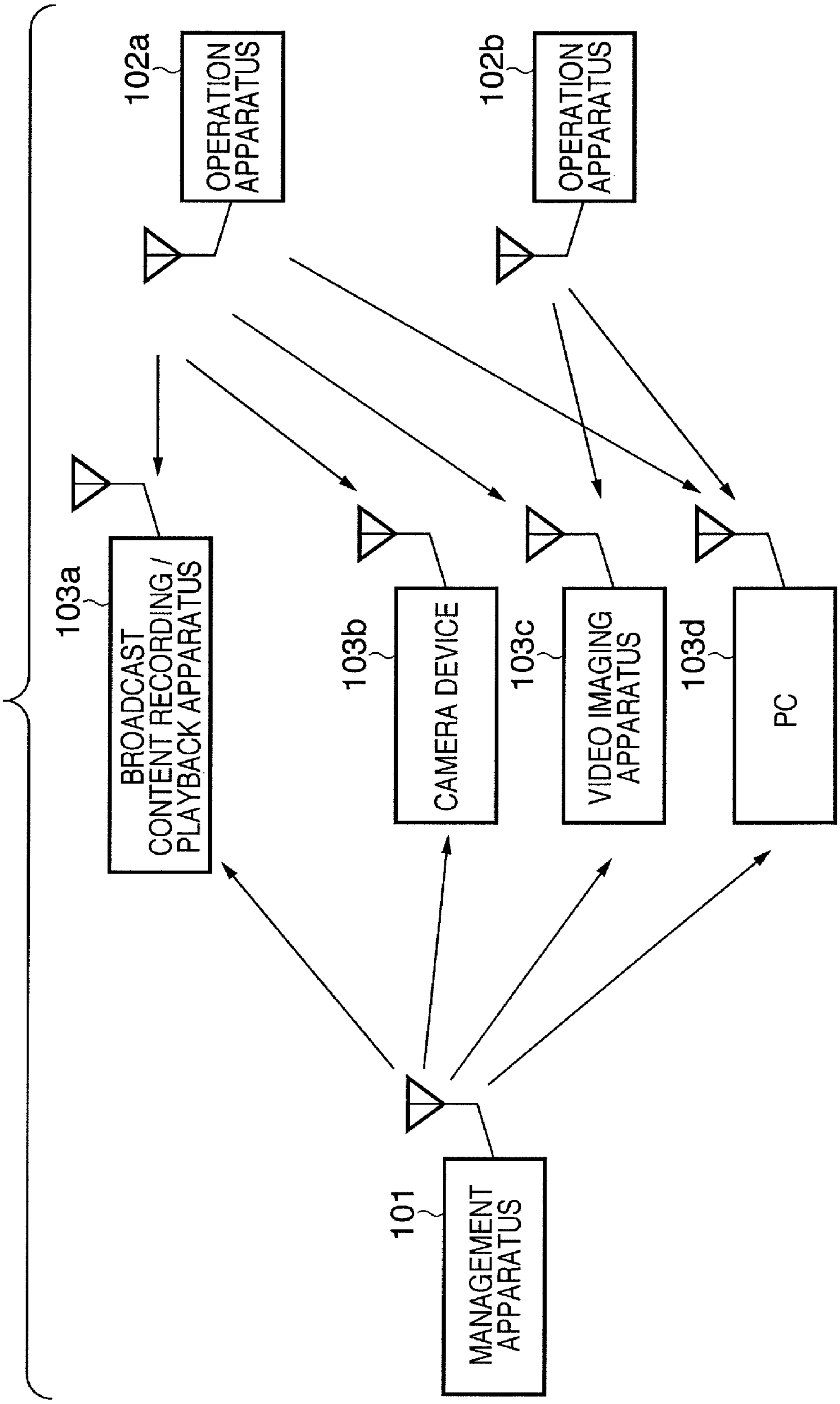
FIG. 1 is a view showing a configuration example of a content management system according to an embodiment described herein.

FIG. 1 is a view showing the configuration of a content management system according to the present embodiment. In FIG. 1, a management apparatus 101 connects with content servers through a wireless LAN to monitor the content inside each content server and issue identification information (hereunder, referred to as "GUID") for uniquely managing each content inside the system. Operation apparatuses 102*a* and 102*b* are connected with a wireless LAN. In accordance with a user operation, the operation apparatuses 102*a* and 102*b* perform operations such as browsing, searching, editing, moving, and copying content data that is recorded in each content server (denoted by reference numerals 103*a* to 103*d* in FIG. 1). Hereunder the operation apparatuses 102*a* and 102*b* are referred to generically as "operation apparatus 102".

The broadcast content recording/playback apparatus 103*a* can receive, record, and playback broadcast content, and can also function as a content server that can provide recorded broadcast content and the like to an external device. More specifically, the broadcast content recording/playback apparatus 103*a* is connected to the wireless LAN, and in accordance with an instruction from the operation apparatus 102, provides content to an external device within the system, transfers content to another content server, or receives content from another content server.

The camera device 103*b* can capture still images or low resolution moving images and create thumbnails, and also functions as a content server that can provide that image content and the like to an external device. More specifically, the camera device 103*b* is connected to the wireless LAN, and in accordance with an instruction from the operation apparatus 102, can provide image data to an external device inside the system, transfer content to a content server, or receive content from another content server.

The video imaging apparatus 103*c* can capture high resolution moving images, and also functions as a content server that can provide the captured moving image content and the like to an external device. More specifically, the video imaging apparatus 103*c* is connected to the wireless LAN, and in accordance with an instruction from the operation apparatus 102, transfers content to another content server inside the system or receives content from another content server.

The personal computer (PC) 103*d* is connected with the wireless LAN, and creates, edits, stores and delivers content. The PC 103*d* also functions as a content server. In accordance with an instruction from the operation apparatus 102, the PC 103*d* can transfer content to another content server inside the system or receive content from another content server.

Hereunder, the broadcast content recording/playback apparatus 103*a*, the camera device 103*b*, the video imaging apparatus 103*c*, and the PC 103*d* are referred to generically as "content servers 103".

Figure 2:
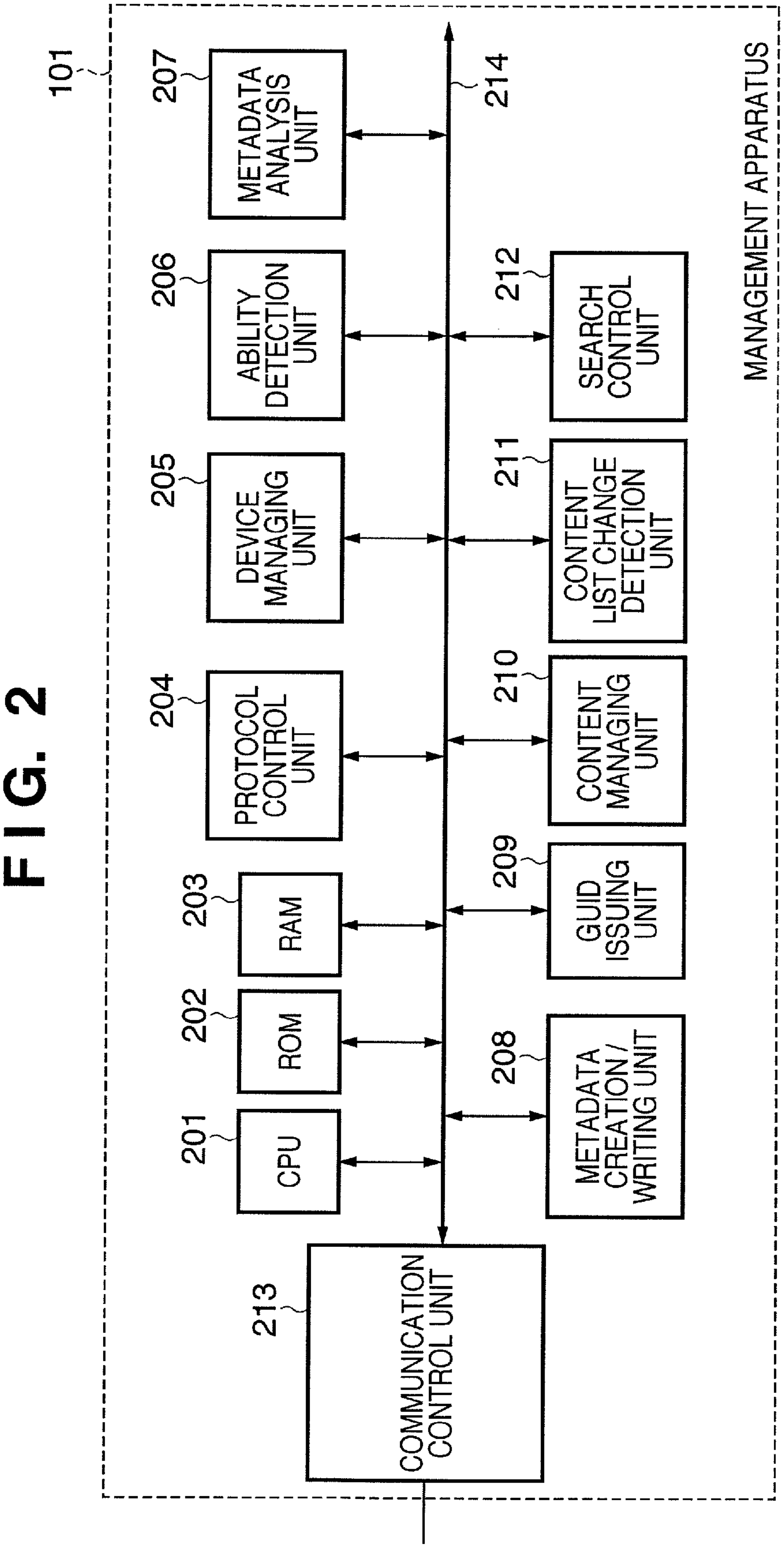
FIG. 2 is a block diagram showing a hardware configuration example of a management apparatus in the content management system according to the embodiment.

FIG. 2 is a block diagram showing an example of the hardware configuration of the management apparatus 101 according to the present embodiment. As shown in FIG. 2, the management apparatus 101 has a central processing unit (CPU) 201, a ROM 202 and a RAM 203. The CPU 201 implements various kinds of control including processing that is described later by executing control programs stored in the ROM 202 or the RAM 203.

Figure 5A:
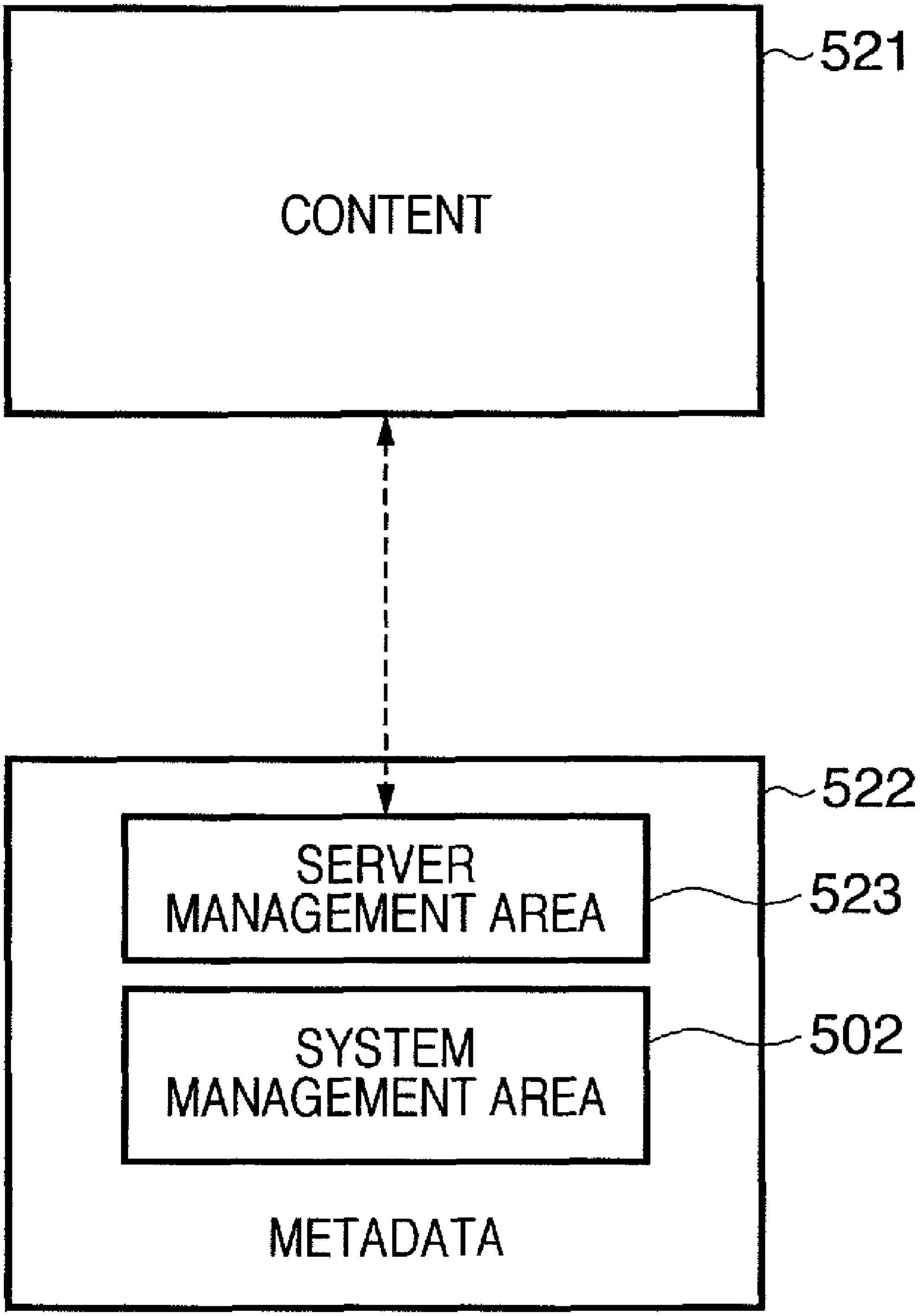
FIG. 5A is a view showing a configuration example of metadata of content according to the embodiment.
Figure 5B:
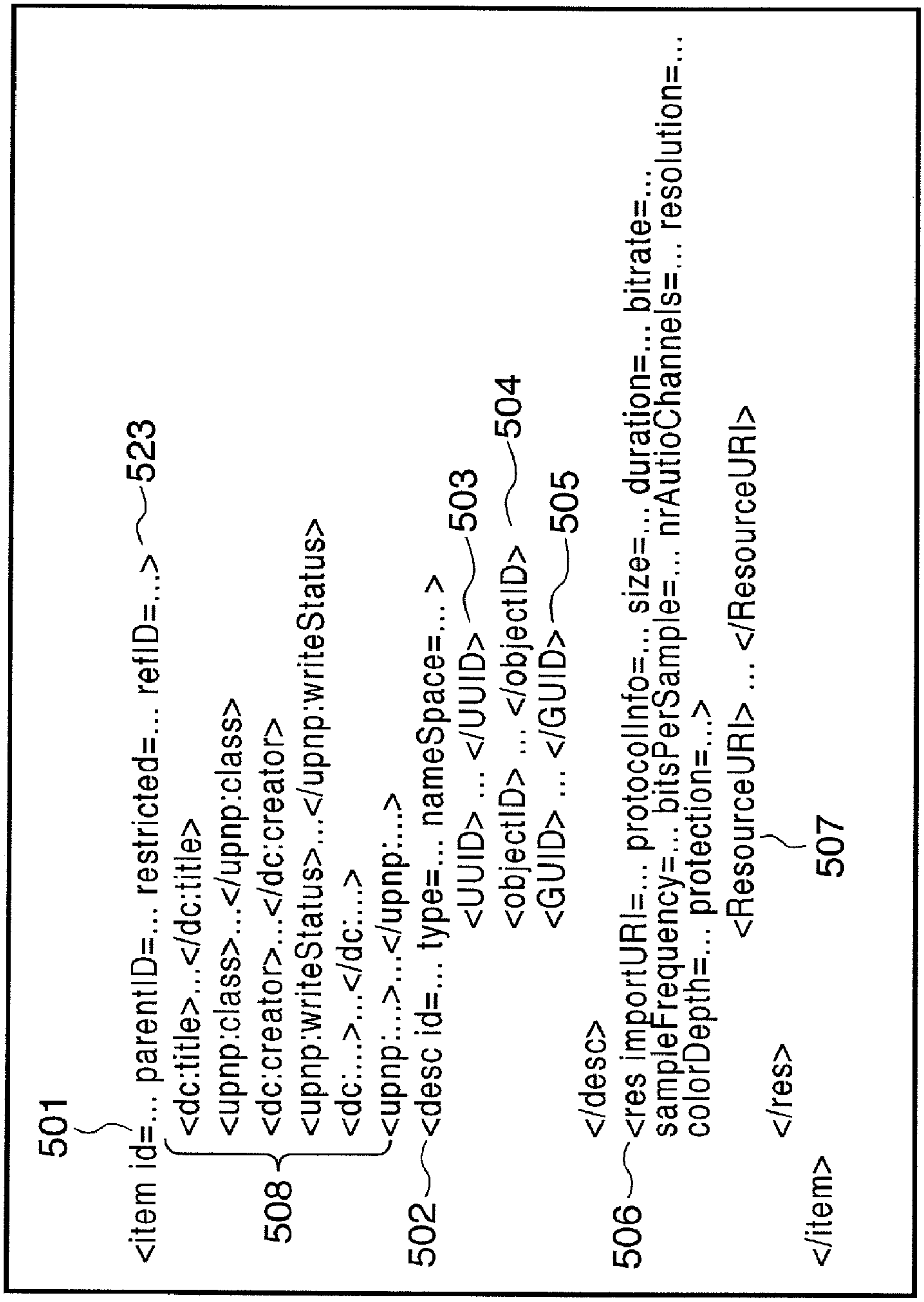
FIG. 5B is a view showing a specific description example of metadata of content according to the embodiment.

A protocol control unit 204 performs control for operations such as communication connection between each device, reading/writing of metadata, and content searches. A device managing unit 205 manages the devices of the content server that is discovered by connection. An ability detection unit 206 detects the ability and resources of each device that is connected in the system. A metadata analysis unit 207 analyzes the metadata of received content (described in detail by FIGS. 5A and 5B), and reads out the GUID and other data. A metadata creation/writing unit 208 creates metadata such as is shown in FIGS. 5A and 5B, and writes that metadata in each of the content servers 103.

A GUID issuing unit 209 issues a GUID that uniquely manages content within the content management system in question by creating a unique ID using a random number that is generated based on the identification ID of the management apparatus or the time or the like. A content managing unit 210 manages content that is stored in the content servers 103. A content list change detection unit 211 detects a change in a content list of the content servers 103. The content list change detection unit 211 sets the content servers 103 such that they generate an event when a content list is changed, and the content list change detection unit 211 can thus detect a change in a content list by detecting that event. A search control unit 212 creates a conditional expression utilizing metadata to search the content stored in the respective content servers 103. A communication control unit 213 performs communication control of the wireless LAN. An internal bus 214 connects each of the above described units so that they can communicate with each other.

Regarding the configuration represented by reference numerals 204 to 212 in FIG. 2, at least one part thereof may also be realized by the CPU 201 executing a predetermined control program that is stored in the ROM 202 or the RAM 203.

Figure 3:
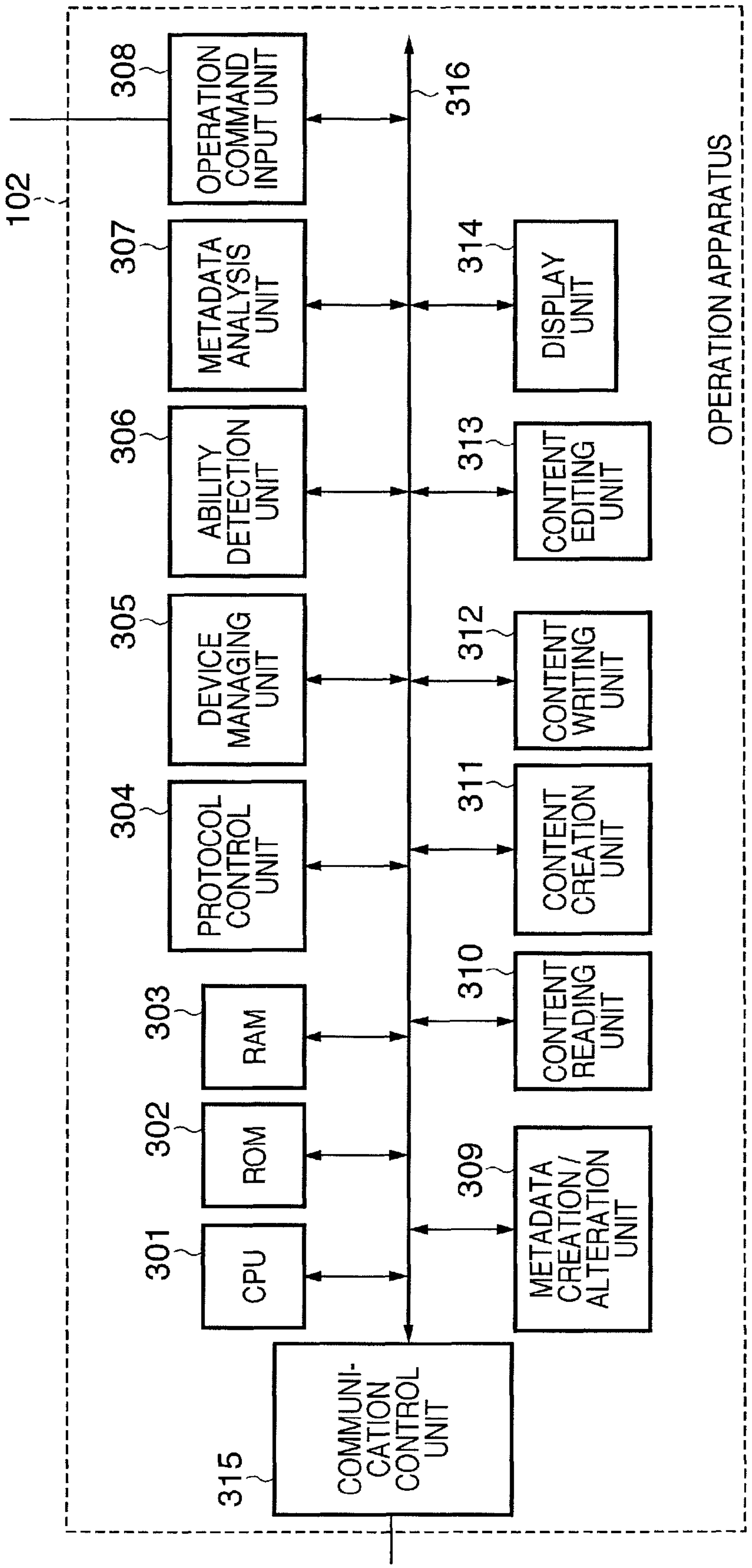
FIG. 3 is a block diagram showing a hardware configuration example of an operation apparatus in the content management system according to the embodiment.

FIG. 3 is a block diagram showing an example of the hardware configuration of the operation apparatus 102. As shown in FIG. 3, the operation apparatus 102 has a central processing unit (CPU) 301, a ROM 302 and a RAM 303. The CPU 301 implements various kinds of control including processing that is described later by executing control programs stored in the ROM 302 or the RAM 303.

A protocol control unit 304 performs control for operations such as communication connection between each device, reading and writing of metadata, and content searches. A device managing unit 305 manages the devices of the content server that is discovered by connection. An ability detection unit 306 detects the ability and resources of connected devices in the system. A metadata analysis unit 307 analyzes the metadata of received content (for example, metadata shown in FIGS. 5A and 5B), and reads out the GUID or other data. An operation command input unit 308 inputs an operation command from a user.

A metadata creation/alteration unit 309 performs creation, insertion and alteration of data with respect to metadata such as is shown in FIGS. 5A and 5B. A content reading unit 310 reads out content that is stored in the respective content servers 103 for browsing and editing and the like. A content creation unit 311 creates and registers new content. A content writing unit 312 writes newly created content or edited content in the content servers 103. A content editing unit 313 edits content that is read out with the content reading unit 310. A display unit 314 displays data such as content, a content list, and a thumbnail. A communication control unit 315 performs communication control of the wireless LAN. An internal bus 316 connects each of the above described units so that they can communicate with each other.

Regarding the configuration represented by reference numerals 304 to 313 in FIG. 3, at least one part thereof may also be realized by the CPU 301 executing a predetermined control program that is stored in the ROM 302 or the RAM 303.

Figure 4:
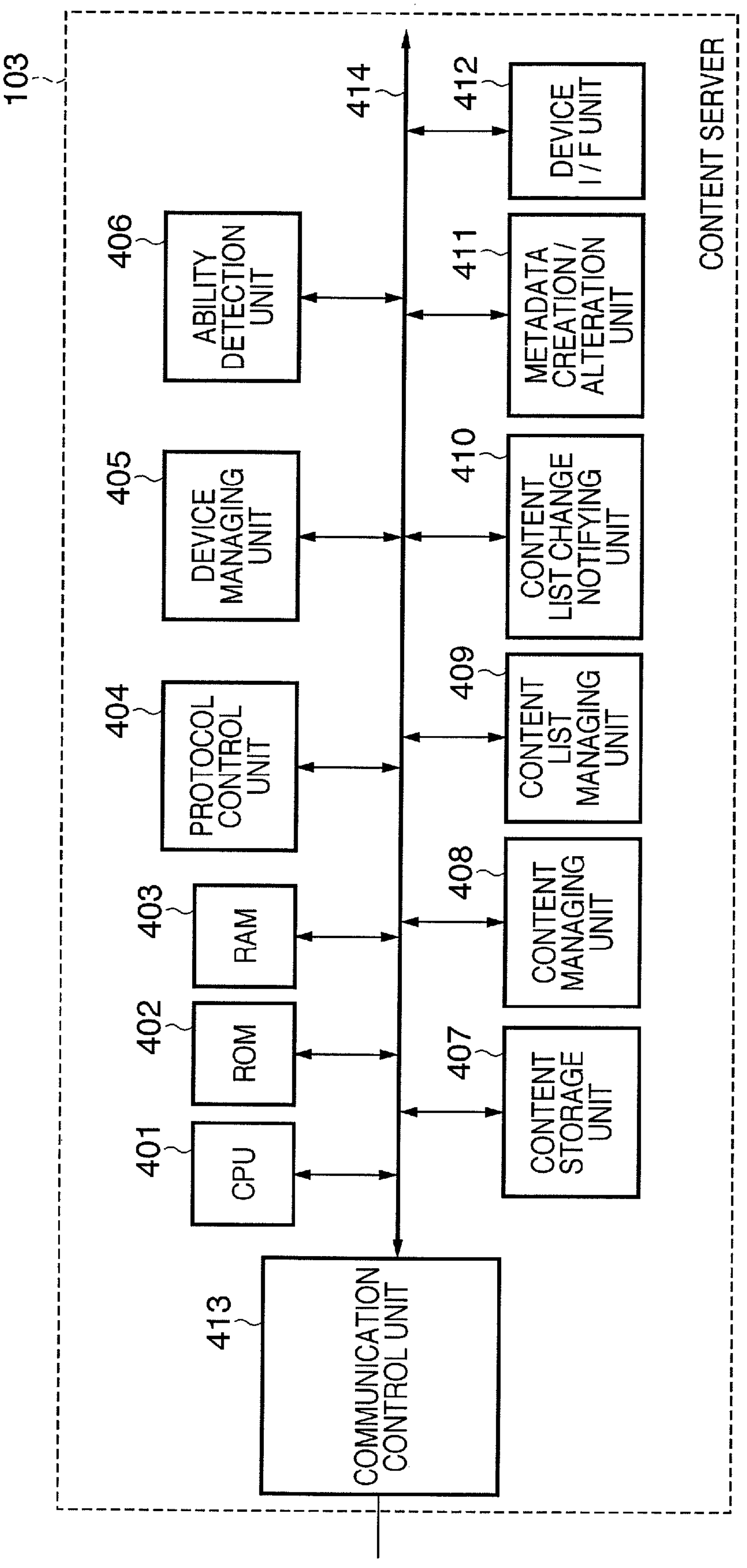
FIG. 4 is a block diagram showing a hardware configuration example of a content server in the content management system according to the embodiment.

FIG. 4 is a block diagram showing a hardware configuration example of a common portion of the content servers 103 shown in FIG. 1.

The content servers 103 possess devices that realize a built-in imaging function or broadcast data receiving function or the like in the respective content servers 103. By connecting those devices with a main control unit as shown in FIG. 4 through a device I/F unit 412, the devices function as the broadcast content recording/playback apparatus 103*a*, the camera device 103*b* or the video imaging apparatus 103*c*. In this case, the main control unit performs storage and management of content.

As shown in FIG. 4, the content servers 103 have a central processing unit (CPU) 401, a ROM 402 and a RAM 403. The CPU 401 implements various kinds of control including processing that is described later by executing control programs that are stored in the ROM 402 or the RAM 403.

A protocol control unit 404 performs control for operations such as communication connection between each device, reading/writing of metadata, and content searches. A device managing unit 405 manages the devices of the content server that is discovered by connection. An ability detection unit 406 detects the ability and resources of the devices that are connected in the system. A content storage unit 407, for example, includes a hard disk and stores content and the metadata thereof.

A content managing unit 408 manages content that is stored in the content server 103, and attaches system data such as an object ID to metadata. A content list managing unit 409 performs management such as adding or changing content for a content list that lists the content inside a content server as shown in FIG. 6. A content list change notifying unit 410 is a unit that, when a change occurs in a content list inside a content server, notifies the designated apparatus to that effect, or sets a change flag in internal data. A metadata creation/alteration unit 411 creates and adds metadata such as is shown in FIG. 5B to content inside a content server. The device I/F unit 412 is an interface for connecting a device that provides a particular function to each apparatus such as a camera or a broadcast data tuner. A communication control unit 413 performs communication control of the wireless LAN. An internal bus 414 connects each of the above described units so that they can communicate with each other.

Regarding the configuration represented by reference numerals 404 to 413 in FIG. 4, at least one part thereof may also be realized by the CPU 401 executing a predetermined control program that is stored in the ROM 402 or the RAM 403.

FIG. 5A is a view showing attendant information (metadata) corresponding to content according to the present embodiment. A metadata 522 that is linked to a content 521 has a server management area 523 and a system management area 502. Identification information for enabling the content server 103 that has the content 521 to uniquely identify that content is recorded by the content server 103 in the server management area 523. The content 521 and the metadata 522 that is the attendant information thereof are associated by identification information (in the present embodiment, an object ID 501 described later) that is recorded in the server management area 523. In the system management area 502, identification information (GUID) for uniquely identifying the content inside the relevant system is recorded by the management apparatus 101. In this connection, identification information that is recorded in the server management area 523 is also recorded in the system management area 502 by the management apparatus 101. Further, the identification information that is recorded in the server management area 523 is identification information (an object ID) that is unique within the relevant content server 103.

FIG. 5B is a view showing a more specific data configuration example of the metadata 522 that is attached to the content according to the present embodiment. In FIG. 5B, the description "item" is a description that is supplied to the server management area 523, and is identification information of the relevant content inside the CDS, and includes data such as "id", that is, object ID 501, and a parent ID that shows the directory in which the content in question exists. These "item" contents (i.e. the server management area 523) are managed by each content server 103 that stores the corresponding content.

A "desc" provides the system management area 502 that can be freely set by the management apparatus 101 for each content, and is identified by a unique nameSpace. According to the present embodiment, a management nameSpace is set in this area, and an area that stores a UUID 503 that identifies a device (content server), an area that stores an object ID 504, and an area that stores a GUID 505 are created.

A "res" 506 is data that shows the location of the actual content (content 521), in which each metadata and a Resource URI 507 as the location of the content are described. The "res" 506 is managed by each content server. In addition, standard metadata 508 such as a Dublin Core (dc) and UPnP also exists.

FIG. 6 is a view showing an example of the data configuration of a content list according to the present embodiment. In this case, the data configuration of a content list according to the DIDL-Lite format used in DLNA is shown.

An "item" 601 indicates content, and a "container" 602 designates a directory. The "item" 601 and the "container" 602 are respectively managed by the content server 103. The configuration shown in FIG. 5B and FIG. 6 is the fundamental configuration that carries out the CDS.

Figure 7:
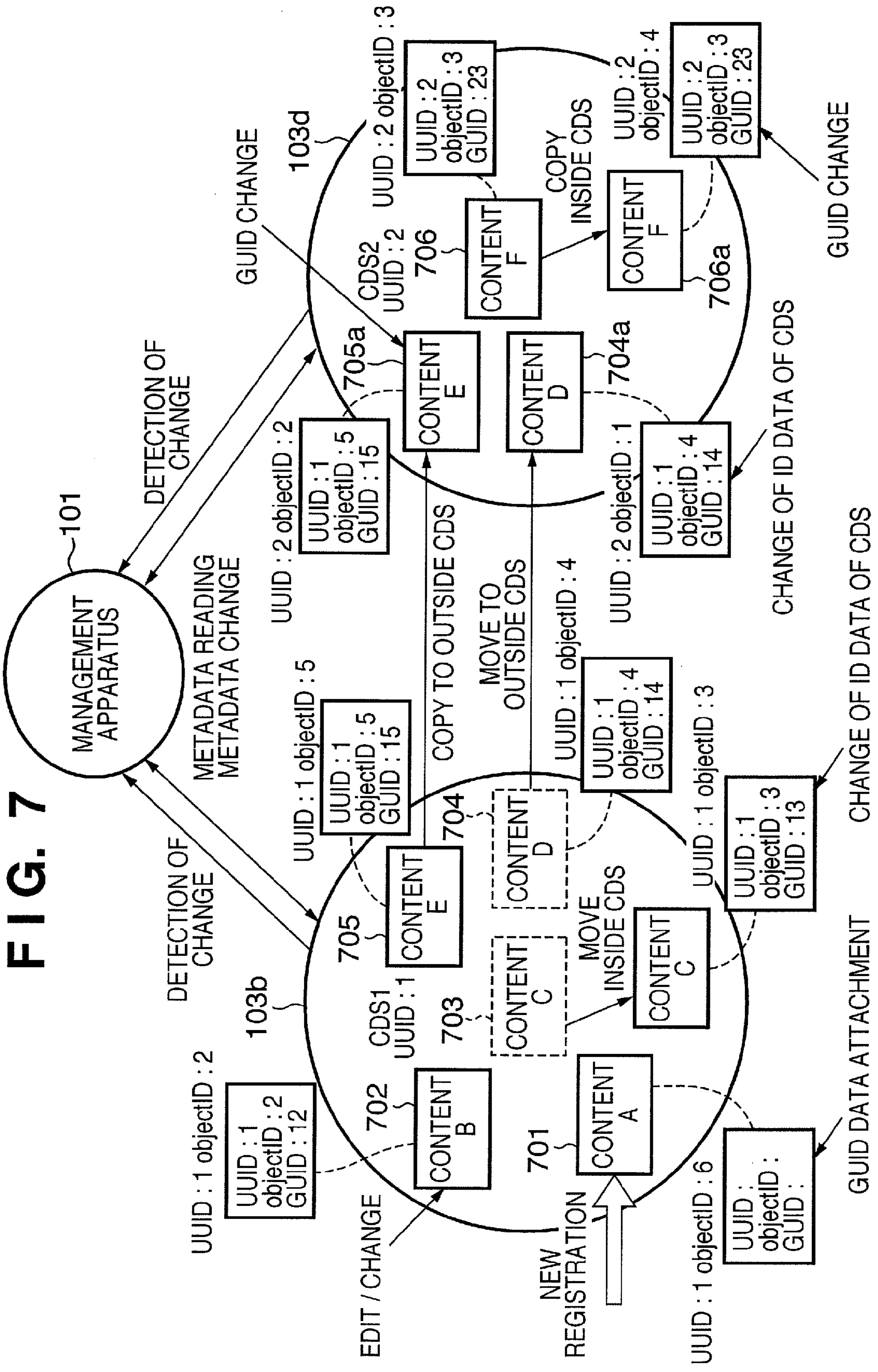
FIG. 7 is a correlation diagram with respect to content and metadata according to the embodiment.

FIG. 7 is a view showing the correlation between metadata and the behavior of content when content is subjected to an operation inside the system. In this case, the management apparatus 101, the camera device 103*b* (CDS UUID is 1) as the content server of the CDS, and the PC 103*d* (CDS UUID is 2) exist, and a content operation is performed. In this connection, since the CDS and the UPnP device correspond 1:1, one UUID is allocated for one CDS. In contrast, it is not necessarily the case that a logical device such as a UPnP device and a physical device correspond 1:1. It is also possible for a plurality of UPnP devices to exist inside one apparatus, and for the content inside a plurality of apparatuses to be managed with a single UPnP device. Accordingly, in FIG. 7, although a situation is shown in which the CDS corresponds 1:1 with physical devices in the form of the camera device 103*b* and the PC 103*d*, a case in which the CDS includes a plurality of physical devices or in which one physical device has a plurality of CDSs is also possible. More specifically, the correspondence between a UUID and a physical device is not limited to a 1:1 correspondence.

Content A 701 is content that is newly created with the operation apparatus 102, and the UUID is set to 1 and the object ID 501 is set to 6 at the CDS. In this connection, the state shown in the figure is the state immediately after the content A 701 is registered in the camera device 103*b* (content server), and setting by the management apparatus 101 with respect to the UUID 503, the object ID 504 and the GUID 505 of the system management area 502 has not yet been performed.

A content B 702 is content that was edited by the operation apparatus 102, and the UUID is set to 1 and the object ID 501 is set to 2 at the CDS. Further, for the system management area 502 the UUID 503 is set as 1, the object ID 504 is set as 2 and the GUID 505 is set as 12, and these do not change after editing.

A content C 703 is content that was moved within the content server (CDS) by the operation apparatus 102. The UUID of the content C 703 at the CDS is set to 1 and the object ID 501 is set to 3. Further, for the system management area 502 the UUID 503 is set as 1, the object ID 504 is set as 3 and the QUID 505 is set as 13, and these do not change after moving.

A content D 704 is content that was moved between content servers (from the camera device 103*b* to the PC 103*d*) by the operation apparatus 102. For the content D 704 prior to moving, the UUID is set to 1 and the object ID 501 is set to 4 at the CDS. For the content D 704*a* after moving, the UUID is set to 2 and the object ID 501 is set to 1 at the CDS by the PC 103*d*. Further, immediately after moving, the UUID 503, the object ID 504, and the GUID 505 remain set as 1, 4 and 14, respectively, in the system management area 502. These IDs will be changed by the management apparatus 101.

A content E 705 is content that was copied between content servers (from the camera device 103*b* to the PC 103*d*) by the operation apparatus 102. For the original content E 705 prior to copying, the UUID is set to 1 and the object ID 501 is set to 5 at the CDS. For the content E 705*a* after copying, the UUID is set to 2 and the object ID 501 is set to 2 at the CDS by the PC 103*d*. Further, the UUID 503, the object ID 504, and the GUID 505 are set as 1, 5, and 15, respectively, in the system management area 502, and these IDs will be changed by the management apparatus 101.

A content F 706 is content that was copied within a content server (PC 103*d*) by the operation apparatus 102. For the content F 706 prior to copying, the UUID is set to 2 and the object ID 501 is set to 3 at the CDS. Further, for the content F 706*a* after copying, the UUID is set to 2 and the object ID 501 is set to 4 at the CDS (a new object ID 501 is assigned by the content server (CDS) when the copy operation is performed). Further, although the UUID 503, the object ID 504, and the GUID 505 of the system management area 502 in the metadata of the content F 706*a* are set as 2, 3, and 23, respectively, these will be updated by the management apparatus 101 (update processing by the management apparatus 101 is described later).

Figure 8:
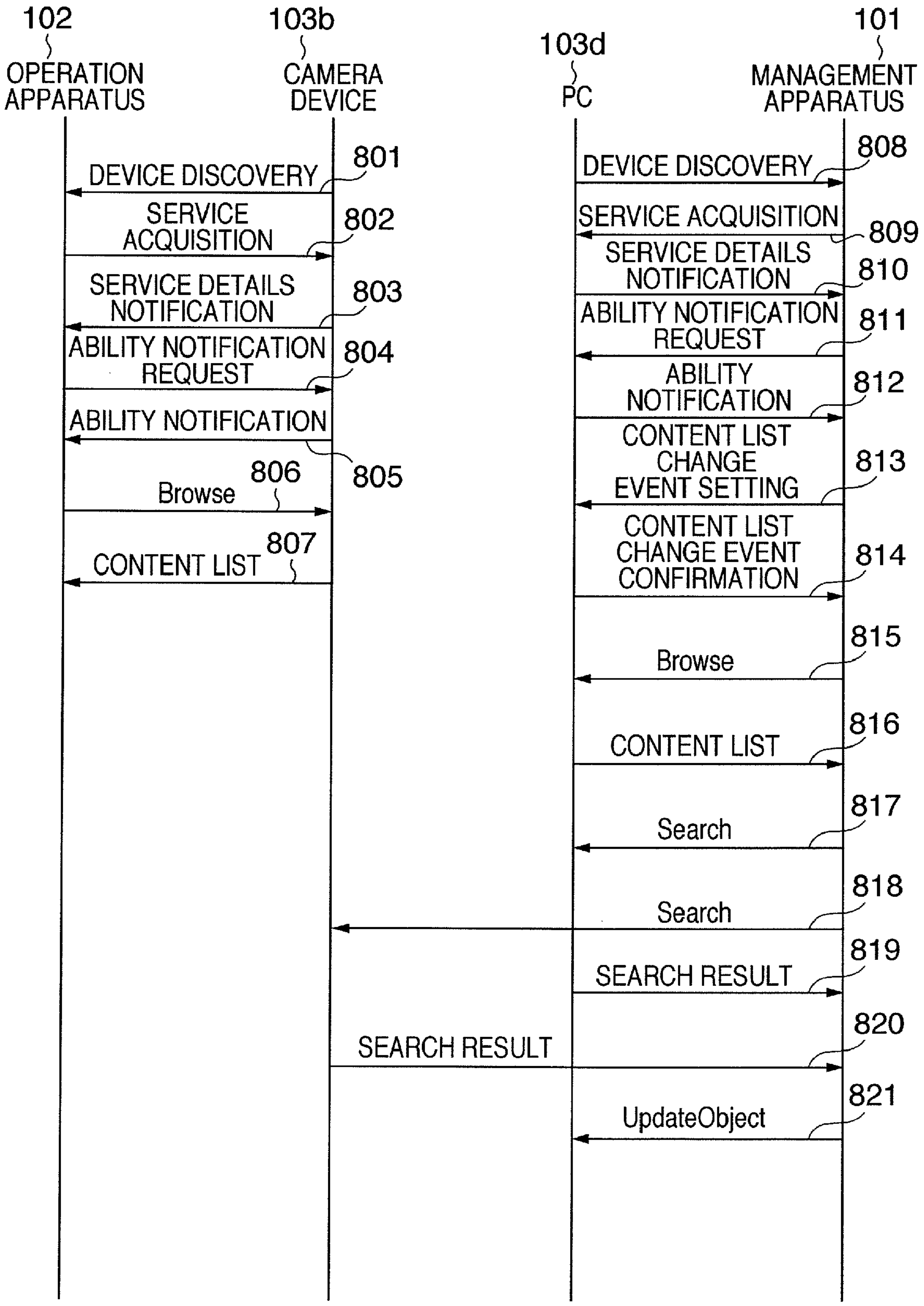
FIG. 8 is a view showing the sequence of operations when a content server is discovered in the content management system of the embodiment.
Figure 13A:
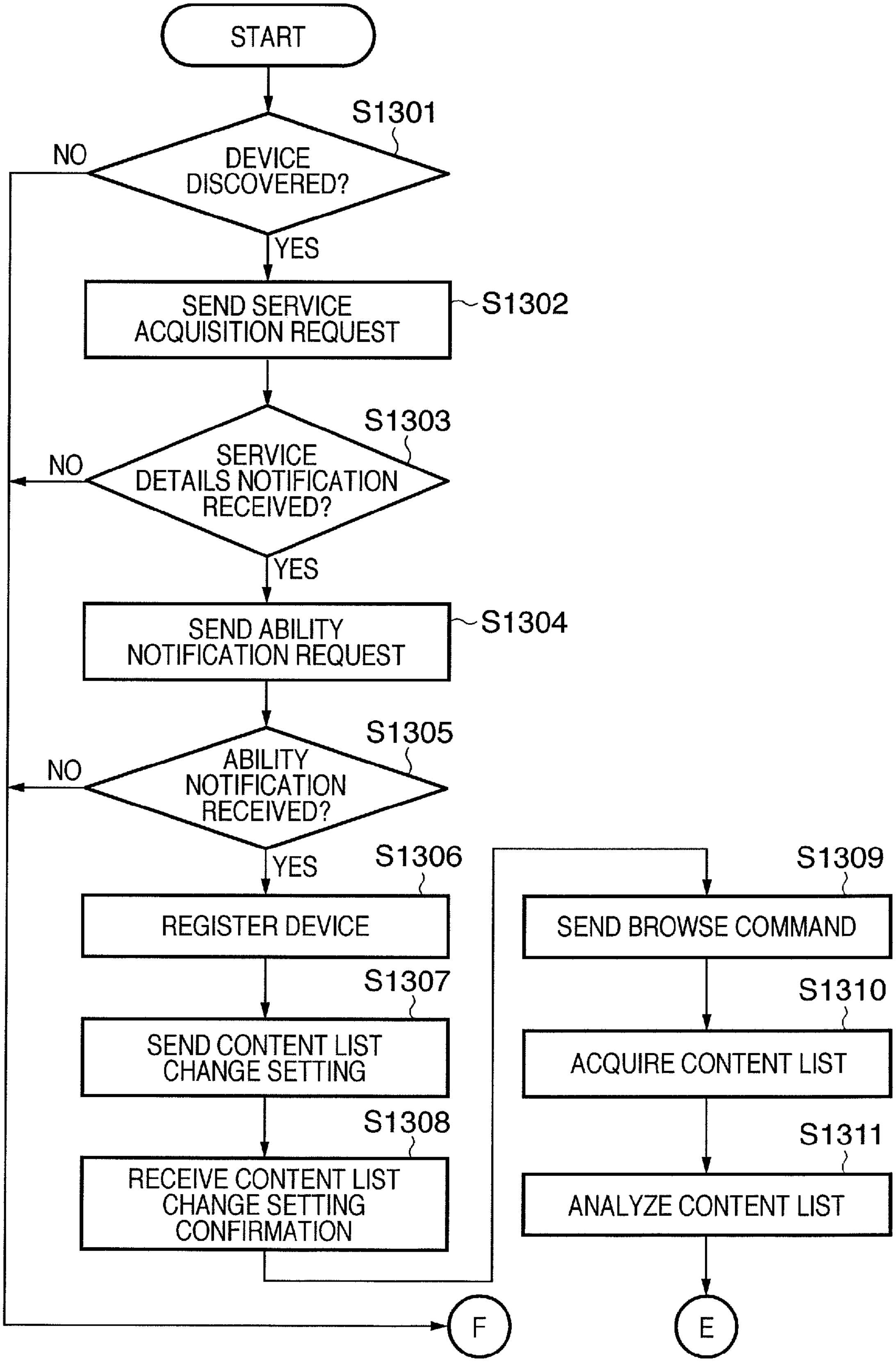
FIG. 13A is a flowchart that shows the operations of a management apparatus according to the embodiment when a content server is discovered.
Figure 13B:
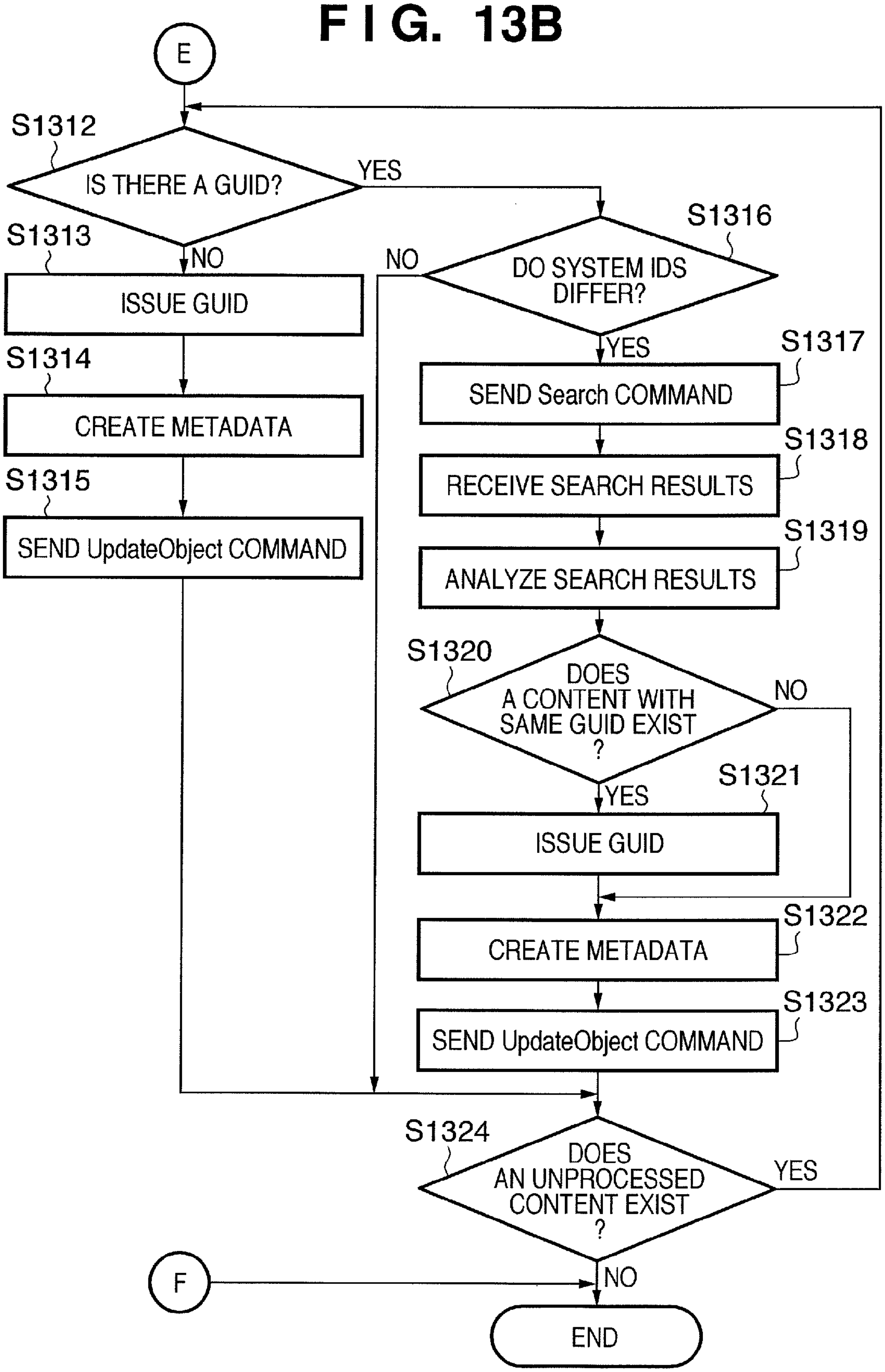
FIG. 13B is a flowchart that shows the operations of a management apparatus according to the embodiment when a content server is discovered.

FIG. 8 is a view showing the sequence of operations when a content server is discovered by the content management system of the present embodiment. Reference numerals 801 to 807 denote steps in the device discovery sequence performed by normal UPnP operations between the operation apparatus 102 and the camera device 103*b* as a content server. Reference numerals 808 to 821 denote steps in a sequence of operations performed between the management apparatus 101 and the PC 103*d* as a content server when the management apparatus 101 discovers the PC 103*d* as a new terminal. This sequence is described later referring to FIGS. 13A and 13B. In this connection, although device discovery processing with respect to the PC 103*d* by the operation apparatus 102 is omitted from the figure, this device discovery processing is the same as the device discovery processing between the operation apparatus 102 and the camera device 103*b*. Further, although device discovery processing with respect to the camera device 103*b* by the management apparatus 101 is omitted from the figure, this device discovery processing is the same as the device discovery processing between the management apparatus 101 and the PC device 103*d*.

Figure 9:
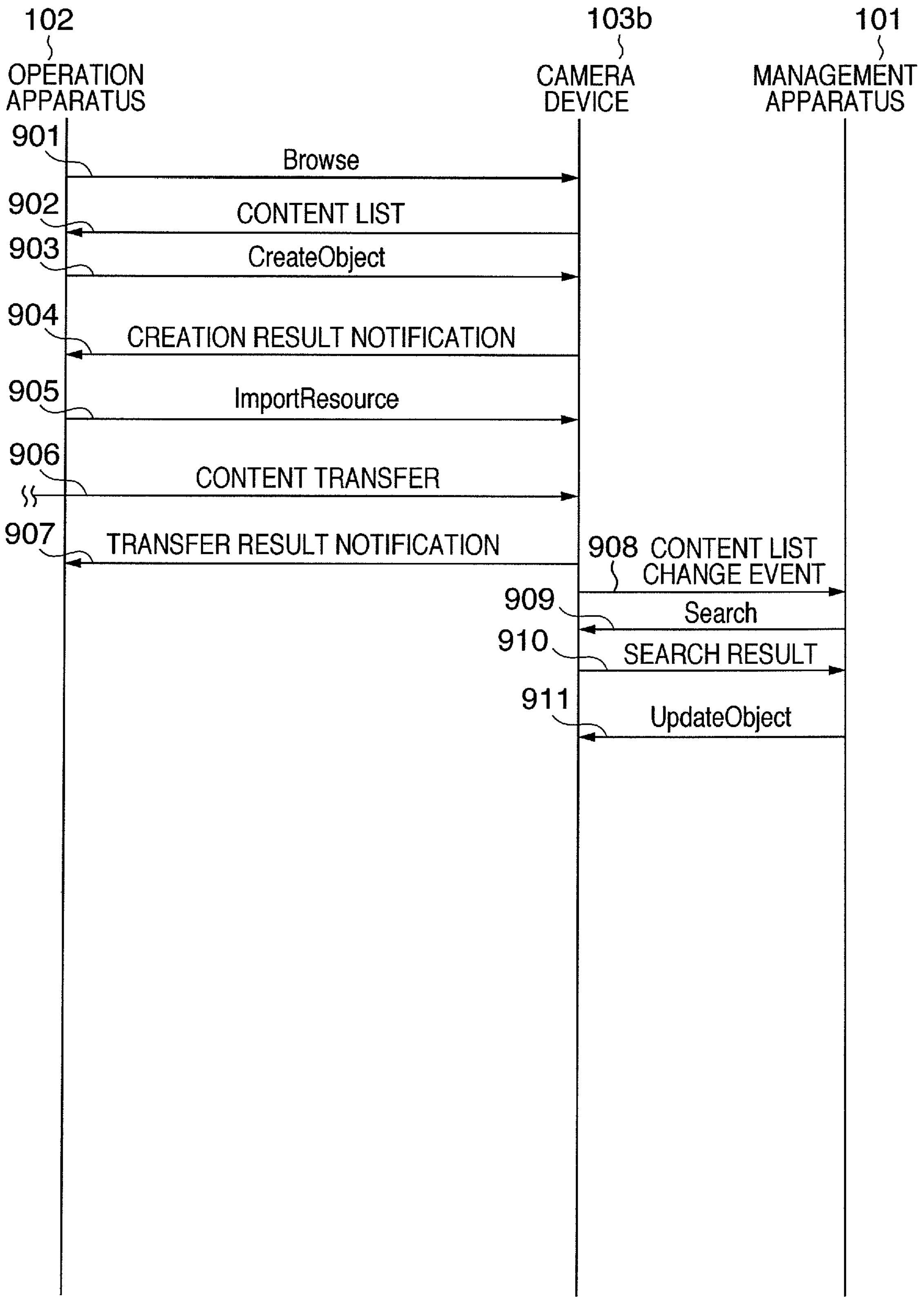
FIG. 9 is a view showing the sequence of operations at the time of a new registration in the content management system of the embodiment.
Figure 10:
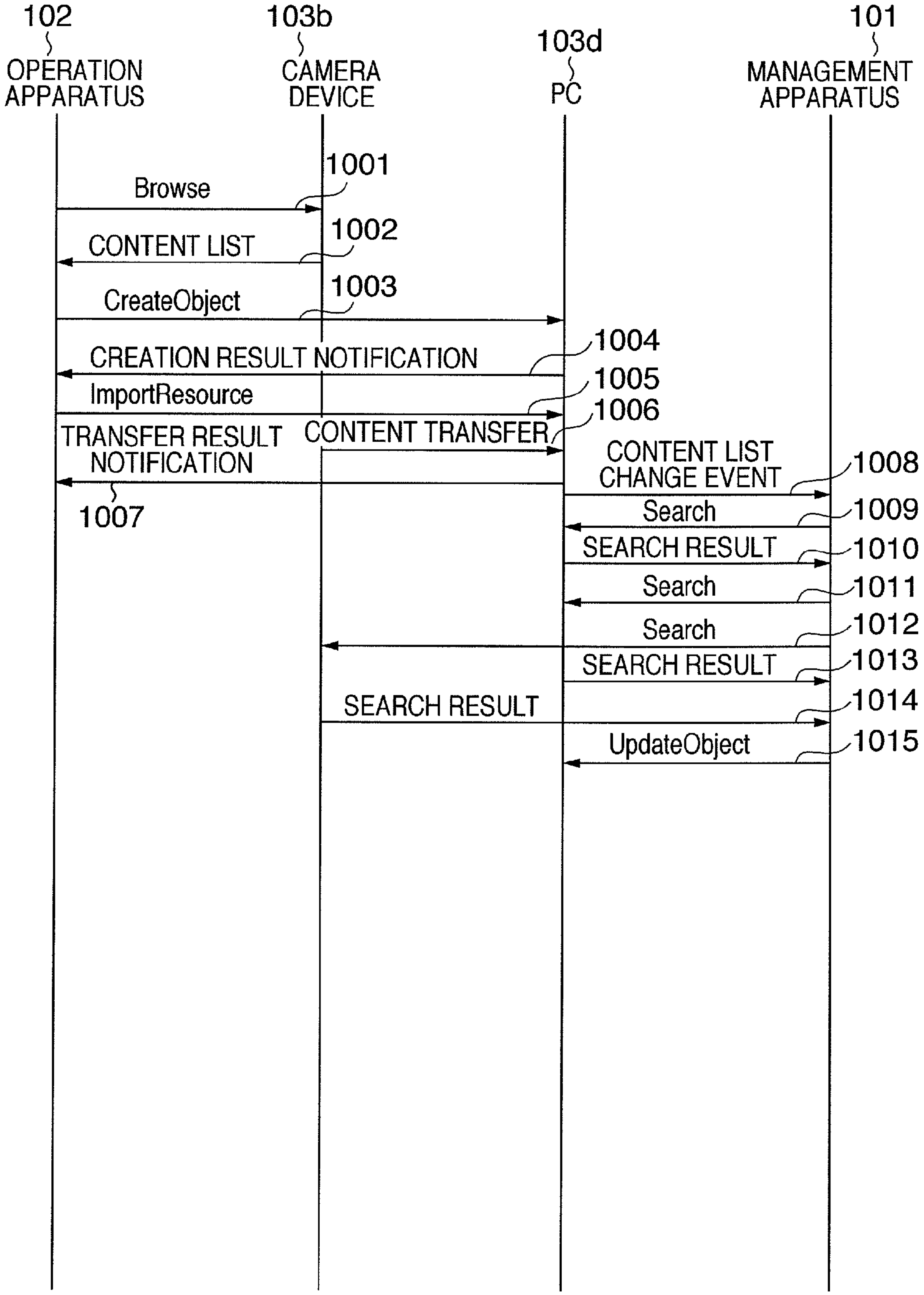
FIG. 10 is a view showing the sequence of operations when copying content in the content management system of the embodiment.
Figure 11:
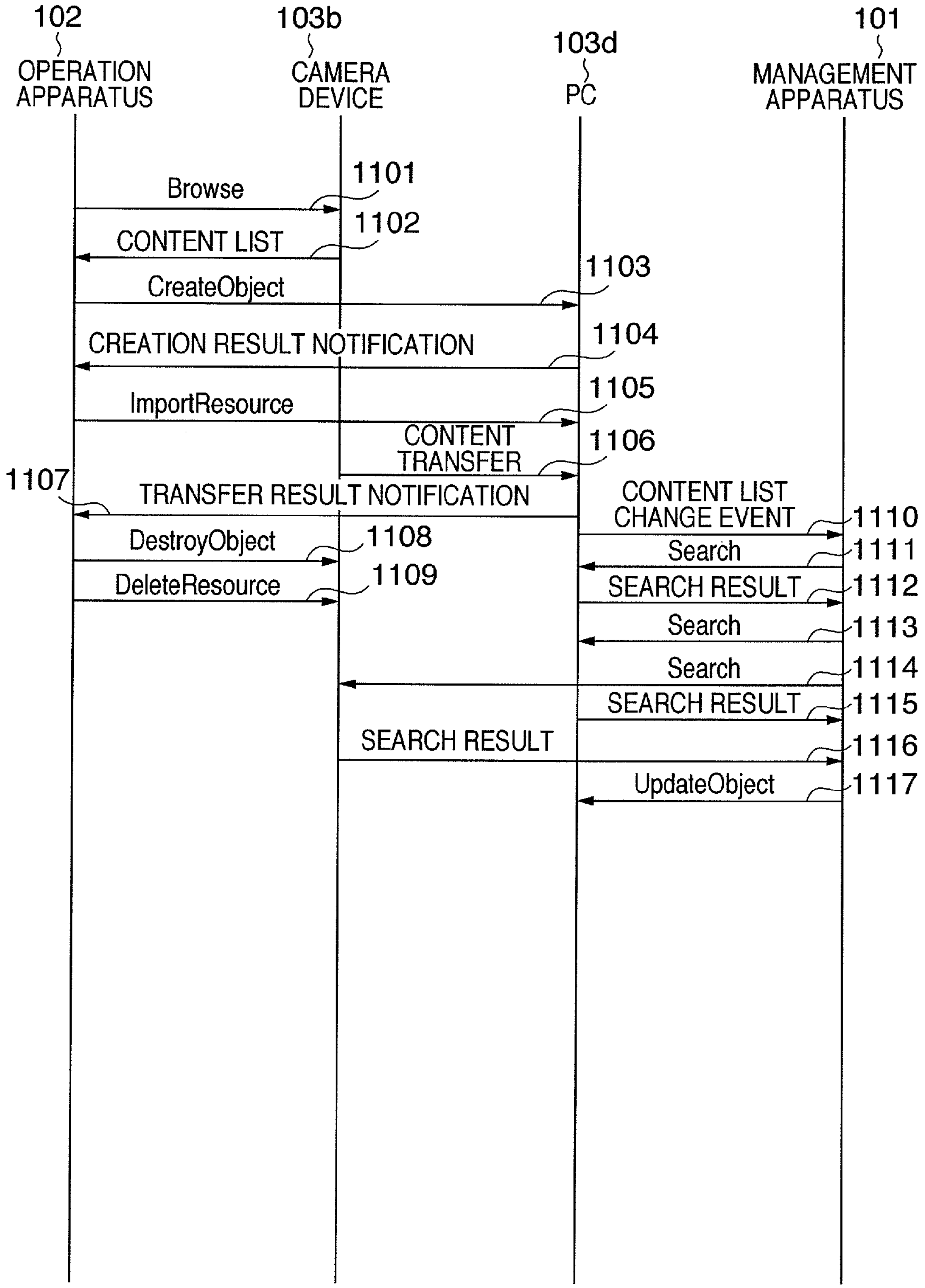
FIG. 11 is a view showing the sequence of operations when moving content in the content management system according to the embodiment.

FIG. 9 is a view showing the sequence of operations at the time of a new content registration according to the content management system of the present embodiment. FIG. 9 shows the sequence of operations when a new content A 701 is registered in the camera device 103*b* by the operation apparatus 102. FIG. 10 is a view showing the sequence of operations when copying content between content servers according to the content management system of the present embodiment. FIG. 10 shows the sequence of operations when content E 705 is copied from the camera device 103*b* to the PC 103*d* by the operation apparatus 102. FIG. 11 is a view showing the sequence of operations when moving content between content servers according to the content management system of the present embodiment. FIG. 11 shows the sequence of operations when content D 704 is moved from the camera device 103*b* to the PC 103*d* by the operation apparatus 102. The operations of the system of the present embodiment that are illustrated using FIGS. 9 to 11 will be described later with reference to the flowcharts shown in FIGS. 12A and 12B, 13A and 13B, and 14A and 14B.

FIG. 15 shows the details of some of the commands that are defined by the DLNA communications protocol. The commands shown in FIG. 15 are mainly commands that are used in the present embodiment. Hereunder, utilizing the commands shown in FIG. 15, processing of the content management system according to the present embodiment will be described in detail.

Figure 12A:
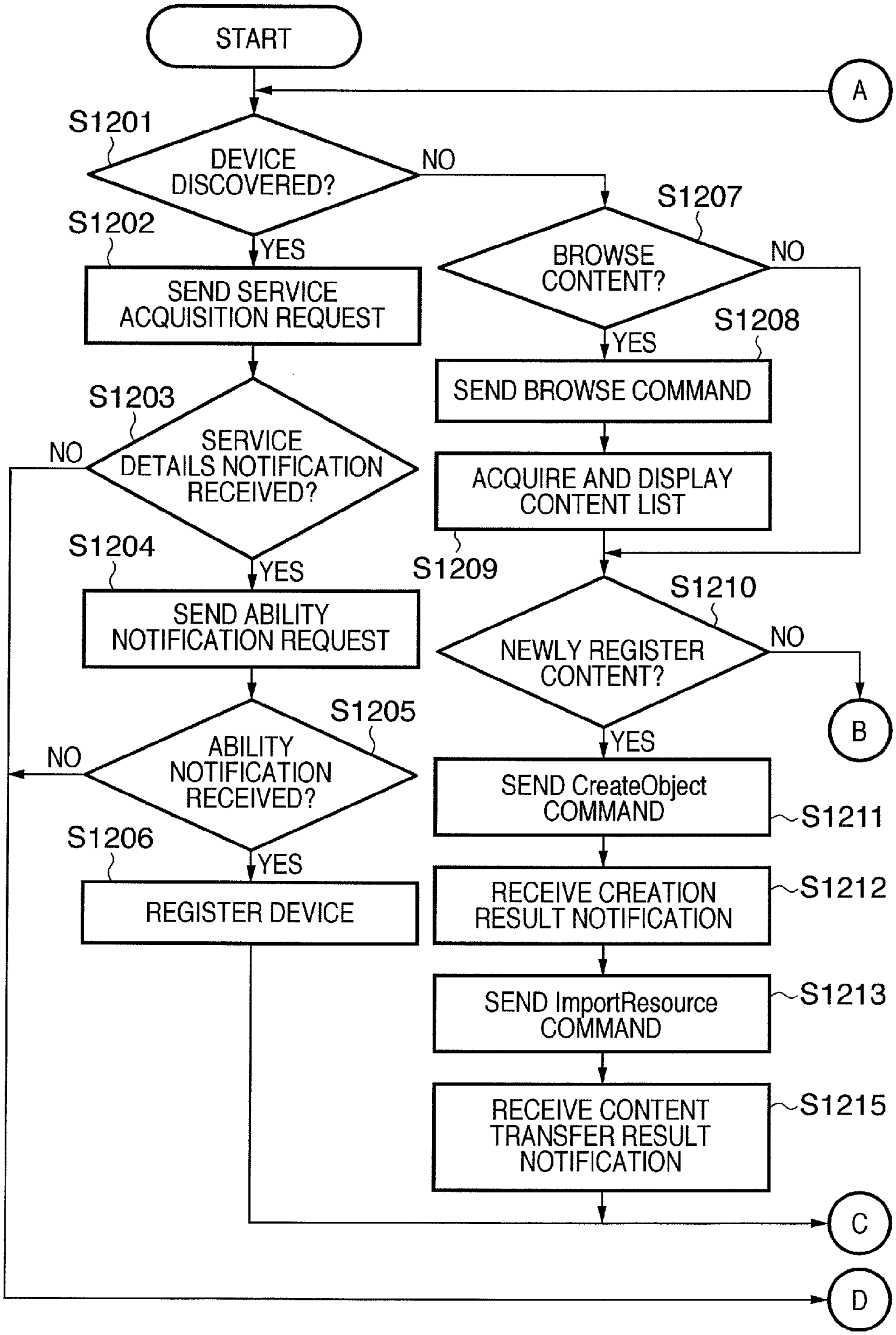
FIG. 12A is a flowchart that shows the operations of an operation apparatus according to the embodiment.
Figure 12B:
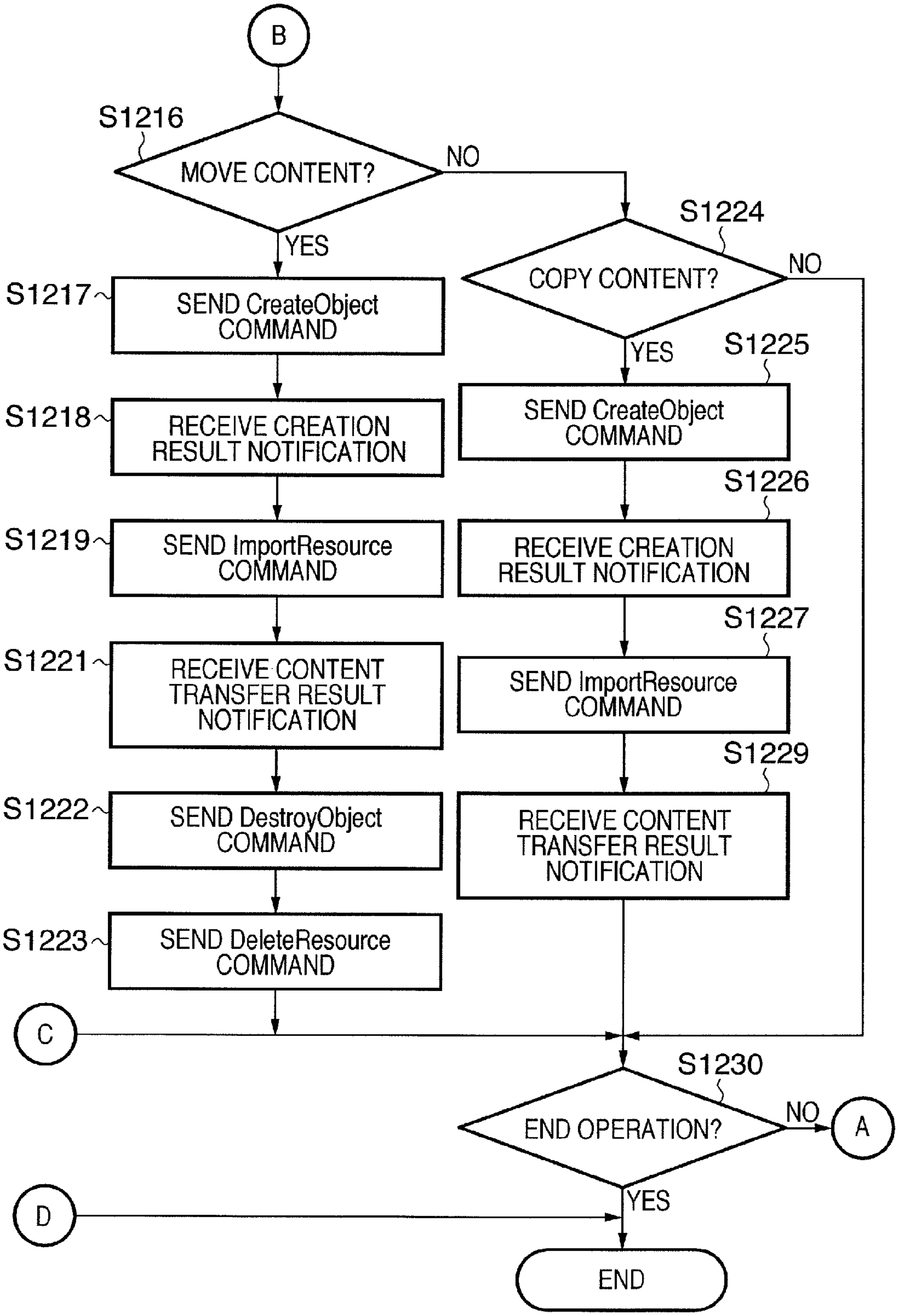
FIG. 12B is a flowchart that shows the operations of an operation apparatus according to the embodiment.

FIGS. 12A and 12B are flowcharts that describe the processing procedures in the operation apparatus 102. An example will now be described in which, as shown in FIG. 8, the camera device 103*b* having a content server function enters into the system and is discovered and registered by the operation apparatus 102.

When the protocol control unit 304 of the operation apparatus 102 discovers a device by receiving a device discovery command (801) from an external apparatus, the protocol control unit 304 sends a service acquisition request (802) that requests the details of the service of the device (steps S1201 and S1202). FIG. 8 illustrates a case in which a device discovery command is received from the camera device 103*b*. The camera device 103*b* sends a service details notification (803) in response to the service acquisition request (802). In response to receipt of the service details notification (803) from the camera device 103*b*, the ability detection unit 306 of the operation apparatus 102 sends an ability notification request (804) for recognizing the ability of the camera device 103*b* (steps S1203 and S1204). The camera device 103*b* sends an ability notification (805) in response to the ability notification request (804). Upon receiving this ability notification (805), the ability detection unit 306 of the operation apparatus 102 registers the information and UUID of that device in the device managing unit 305 (steps S1205 and S1206). In step S1203 and step S1205, if a service details notification is not received or if an ability notification cannot be received, or if it is found as the result of the ability notification that the device does not have a function as a content server, the processing ends.

Next, the processing of the operation apparatus 102 is described for a case in which the operation apparatus 102 browses the content inside the camera device 103*b* and a case in which new content is created and registered in the camera device 103*b*.

First, the case of browsing content is described. When the operation command input unit 308 accepts a command to browse a content list inside the camera device 103*b* as the result of a user operation or the like, the protocol control unit 304 sends a Browse command (806) to the camera device 103*b* (steps S1207 and S1208). In response to the Browse command (806), the camera device 103*b* sends a content list (807) as shown in FIG. 6. Upon receiving the content list from the camera device 103*b*, the operation apparatus 102 displays the content list on the display unit 314 (step S1209).

Next, new registration of content will be described using the sequence of operations shown in FIG. 9. In this connection, the exchange of a Browse command (901) and a content list (902) in FIG. 9 is carried out in the same manner as described above in steps S1207 to S1209. When a command to register new content is input from the operation command input unit 308, the protocol control unit 304 sends a CreateObject command (903) to the camera device 103*b* (steps S1210 and S1211). This CreateObject command is a command that gives the instruction for the creation of metadata, and is created at the metadata creation/alteration unit 309 based on the content that is the object of new registration. The content as the object of new registration is created by the content creation unit 311. The metadata creation/alteration unit 411 of the camera device 103*b* creates metadata according to the CreateObject command (903), and sends a creation result notification (904). Through this processing, the fundamental new metadata is created inside the camera device 103*b*. The content managing unit 408 of the camera device 103*b* issues an object ID in relation to the created metadata, and records this as the object ID 501 of the metadata in question in the server management area 523.

The metadata creation/alteration unit 309 of the operation apparatus 102 receives the creation result notification (904) from the camera device 103*b* (step S1212). Subsequently, the metadata creation/alteration unit 309 creates metadata that shows the actual location of the content that is the new registration object, and sends an ImportResource command (905) from the protocol control unit 304 (step S1213). At the camera device 103*b* that receives the ImportResource command (905), the content is transferred (906) from the location that is designated according to the ImportResource command, and stored in the content storage unit 407. A transfer result notification (907) is then returned to the operation apparatus 102. Upon receiving this transfer result notification, the operation apparatus 102 completes the operation for newly registering content (step S1215). In this connection, in a case in which content that is a new registration object is managed by the operation apparatus 102 itself, when the operation apparatus 102 receives a content transfer request from the camera device 103*b*, the operation apparatus 102 sends the content to the camera device 103*b*.

Next, an example in which the operation apparatus 102 moves content from the camera device 103*b* to the PC 103*d* will be described with reference to FIG. 11. In this connection, the exchange of a Browse command (1101) and a content list (1102) in FIG. 11 is carried out in the same manner as described above in steps S1207 to S1209.

When a command for moving content from the camera device 103*b* to the PC 103*d* is input from the operation command input unit 308, the protocol control unit 304 sends a CreateObject command (1103) to the PC 103*d* (steps S1216 and S1217). As described above, a CreateObject command is a command that gives the instruction for the creation of metadata. In this connection, at the metadata creation/alteration unit 309, the CreateObject command is created based on metadata of the content that is the movement object that is registered in the content list acquired at step S1209. The metadata creation/alteration unit 411 of the PC 103*d* creates metadata according to the instructions of the CreateObject command (1103), and sends a creation result notification (1104) to the operation apparatus 102. By receiving this creation result notification, the operation apparatus 102 recognizes that the metadata that is the same as the metadata of the content as the movement source was created inside the PC 103*d* (step S1218). In this connection, at the PC 103*d*, the content managing unit 408 issues an object ID with respect to this newly created metadata and records this object ID as the object ID 501 in the server management area 523 of the newly created metadata.

The metadata creation/alteration unit 309 of the operation apparatus 102 sets metadata showing the location of the content D 704 that is a movement object inside the camera device 103*b* that is registered in the content list that was acquired at step S1209 in an ImportResource command. It then sends the metadata as an ImportResource command (1105) from the protocol control unit 304 (step S1219). At the PC 103*d* that receives the ImportResource command (1105), content is transferred from the designated location in accordance with the command, received (1106), and stored in the content storage unit 407. A transfer result notification (1107) is then sent to the operation apparatus 102. When the operation apparatus 102 receives this transfer result notification (step S1221), it deletes the content D 704 for which moving is completed from the camera device 103*b*. More specifically, the operation apparatus 102 sends a DestroyObject command (1108) from the protocol control unit 304 to the camera device 103*b* to delete the metadata of the movement source (step S1222). Further, the operation apparatus 102 sends a DeleteResource command (1109) to the camera device 103*b* through the protocol control unit 304 to delete the content of the movement source (step S1223).

Next, the processing of the operation apparatus 102 when copying content from the camera device 103*b* to the PC 103*d* will be described with reference to FIG. 10. In this connection, the exchange of a Browse command (1001) and a content list (1002) in FIG. 10 is carried out in the same manner as described above in steps S1207 to S1209.

When a command to copy content is input from the operation command input unit 308, the operation apparatus 102 sends a CreateObject command (1003) from the protocol control unit 304 to the copy destination apparatus (PC 103*d*) (steps S1224 and S1225). Thus, the operation apparatus 102 instructs the PC 103*d* to create metadata. This CreateObject command (1003) is created based on metadata of the content as the copy source that is registered in the content list acquired at step S1209 by the metadata creation/alteration unit 309. When the metadata creation/alteration unit 411 of the PC 103*d* creates metadata in accordance with the instructions of the CreateObject command (1003), it sends a creation result notification (1004) to the operation apparatus 102. The operation apparatus 102 receives this creation result notification (step S1226). Thus, metadata that is the same as the metadata of the source content is created inside the PC 103*d*. In this connection, the content managing unit 408 of the PC 103*d* issues an object ID with respect to the created metadata, and records the object ID as the object ID 501 in the server management area 523 of the created metadata.

Next, the metadata creation/alteration unit 309 of the operation apparatus 102 sets metadata showing the location of the content as the copy object inside the camera device 103*b* that is registered in the content list that was acquired at step S1209 in an ImportResource command. It then sends the metadata as an ImportResource command (1005) from the protocol control unit 304 (step S1227). At the PC 103*d* that receives the ImportResource command (1005), the metadata creation/alteration unit 411 alters the metadata in accordance with the instructions of the ImportResource command, receives content from the designated location, and stores the content in the content storage unit 407 (1006). More specifically, the PC 103*d* receives the designated content from the camera device 103*b* and stores the content in the content storage unit 407. The PC 103*d* then sends a transfer result notification (1007) to the operation apparatus 102. Upon receiving this transfer result notification (1007), the operation apparatus 102 ends the copy operation processing (step S1229).

If a command to end operations (end operations related to content) is input from the operation command input unit 308 of the operation apparatus 102, the present processing ends, and if a command to end operations is not input, the processing returns to step S1201 (step S1230).

The above described processing creates new metadata when registering new content, and when copying or moving existing content, the metadata of the source content is adhered to. It is thus possible to append metadata for each content operation.

Next, processing to manage metadata by the management apparatus 101 will be described. First, processing performed by the management apparatus 101 when a new content server is discovered is described with reference to the flowcharts shown in FIGS. 13A and 13B. Hereunder, description is made by taking an example (FIG. 8) in which the PC 103*d* that has a function as a content server newly participates in the system, and is discovered and registered by the management apparatus 101.

First, when the protocol control unit 204 of the management apparatus 101 discovers a device by receiving a device discovery command (808) from the PC 103*d*, the protocol control unit 204 sends a service acquisition request (809) to the PC 103*d* (steps S1301 and S1302). The PC 103*d* sends a service details notification (810) in response to this service acquisition request (809). When the protocol control unit 204 of the management apparatus 101 receives the service details notification (810) (step S1303), the ability detection unit 206 sends an ability notification request (811) for recognizing the ability of the PC 103*d* (step S1304). The PC 103*d* sends an ability notification (812) in response to the ability notification request (811). Upon receiving this ability notification (812) (step S1305), the ability detection unit 206 determines whether or not the PC 103*d* has a function of a content server. When the ability detection unit 206 determines that the PC 103*d* has a function of a content server, the device managing unit 205 registers the UUID and information of that device (step S1306).

Further, the content list change detection unit 211 sends a content list change event setting (813) to the PC 103*d* so as to send a notification at the time of a content list change (step S1307). The PC 103*d* sets itself in accordance with the content list change event setting (813) so that, when a change occurs in its own content list, the PC 103*d* issues an event that notifies the content list change detection unit 211 to that effect. The PC 103*d* then sends a content list change event confirmation (814) to the management apparatus 101. The management apparatus 101 receives the content list change event confirmation (814) from the PC 103*d* (step S1308). In this connection, in step S1301, step S1303, and step S1305, when a device is not discovered, service details are not notified, or an ability notification cannot be received, the present processing is ended.

Next, the management apparatus 101 updates the identification information in the system management area 502 for the content stored in the PC 103*d* that newly participates in the system. First, in order to examine the content stored in the PC 103*d*, the management apparatus 101 sends a Browse command (815) from the protocol control unit 304 (step S1309). When a content list (816) as shown in FIG. 6 is acquired as a result of the Browse command (815) (step S1310), the metadata analysis unit 207 analyzes the content list (step S1311).

Subsequently, the metadata of the content described in the content list is acquired to check whether or not data of the GUID 505 exists in the system management area 502 inside the acquired metadata. When there is no GUID 505 data, the GUID issuing unit 209 issues a GUID (step S1312 and S1313). The metadata creation/writing unit 208 then records the GUID issued as described above as the GUID 505 data in the management area 502 inside the metadata in question. Further, the device managing unit 205 sets the UUID registered in relation to the PC 103*d* and the object ID 601 in the content list that was read out as the UUID 503 and the object ID 504 in the system management area 502. Thus, metadata that updates the system management area 502 is created (step S1314). The protocol control unit 204 then issues an UpdateObject command 821 to the PC 103*d*, and changes the corresponding metadata inside the PC 103*d* as described above (step S1315).

In contrast, when an ID exists for the GUID 505 of the system management area 502 inside the metadata at step S1312, the system IDs are compared (step S1316). More specifically, the UUID of the PC 103*d* that possesses the content in question that is registered in the device managing unit 205 and the UUID 503 of the system management area 502 are compared. Further, the object ID 501 of the content in question that is in the content list that was read in steps S1310 and S1311 and the object ID 504 that is in the system management area 502 are compared. When either the UUID or the object ID differs, the search control unit 212 sends Search commands to content servers inside the system through the protocol control unit 204 (step S1317). In the example shown in FIG. 8, Search commands (817 and 818) are issued to the camera device 103*b* and the PC 103*d*. In this case, the search condition of the Search commands is one that causes each content server to search whether there is content that has the same ID as the ID in the GUID 505. The search control unit

212 receives search results (819, 820) from each content server (step S1318), and analyzes the search result (step S1319). Thus, the search control unit 212 searches whether there is content that has the same ID as the ID in the GUID 505 inside the system.

When it is found as the result of analysis that content exists with the same GUID 505, the GUID issuing unit 209 issues a new GUID for that content (steps S1320, S1321). The metadata creation/writing unit 208 then updates the GUID 505 of the system management area 502 inside the metadata. Further, it sets the UUID that is registered as the PC 103*d* in the device managing unit 205 and the object ID 501 of the read content list in the UUID 503 and the object ID 504 of the system management area 502. Thus, metadata of content in a new content server is created (step S1322). Subsequently, the management apparatus 101 sends an UpdateObject command (821) from the protocol control unit 204 to instruct the PC 103*d* to change the metadata based on the data that was created as described above (step S1323). The above processing is repeated in order, and when unprocessed content no longer exists the processing ends (step S1324).

According to the above processing, when a new content server is discovered a system-compatible GUID can also be attached to the content in the new content server, and the content can be uniquely managed inside the system. Also, since a content server can be set so as to send a notification event when a content list changes, as described below with reference to FIGS. 14A and 14B, the management apparatus 101 can detect that the content was subjected to an operation (new registration, movement, copying or the like) inside a content server or between content servers.

Figure 14A:
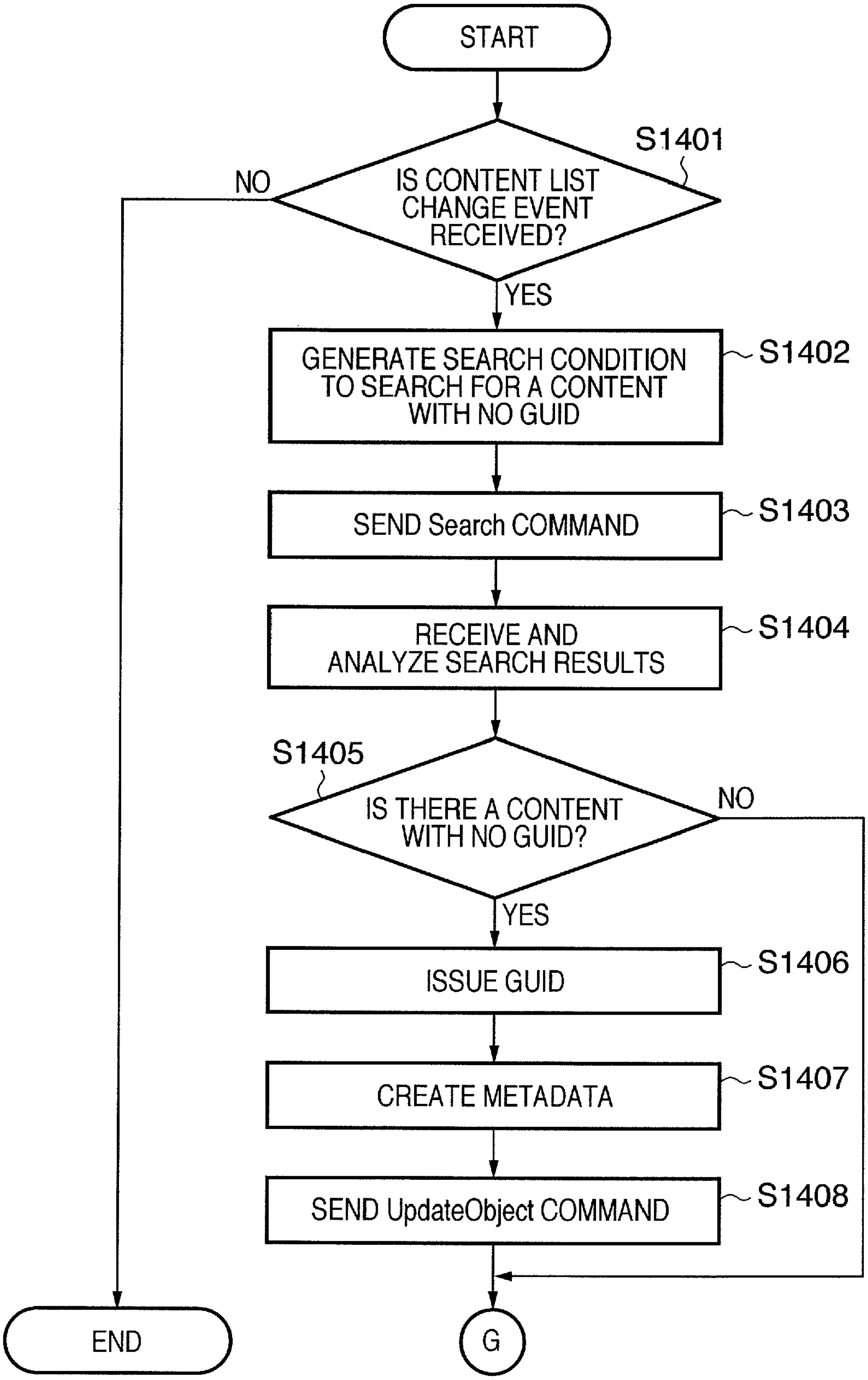
FIG. 14A is a flowchart that shows the operations of a management apparatus according to the embodiment when performing a content operation (registration of new content, moving or copying content)
Figure 14B:
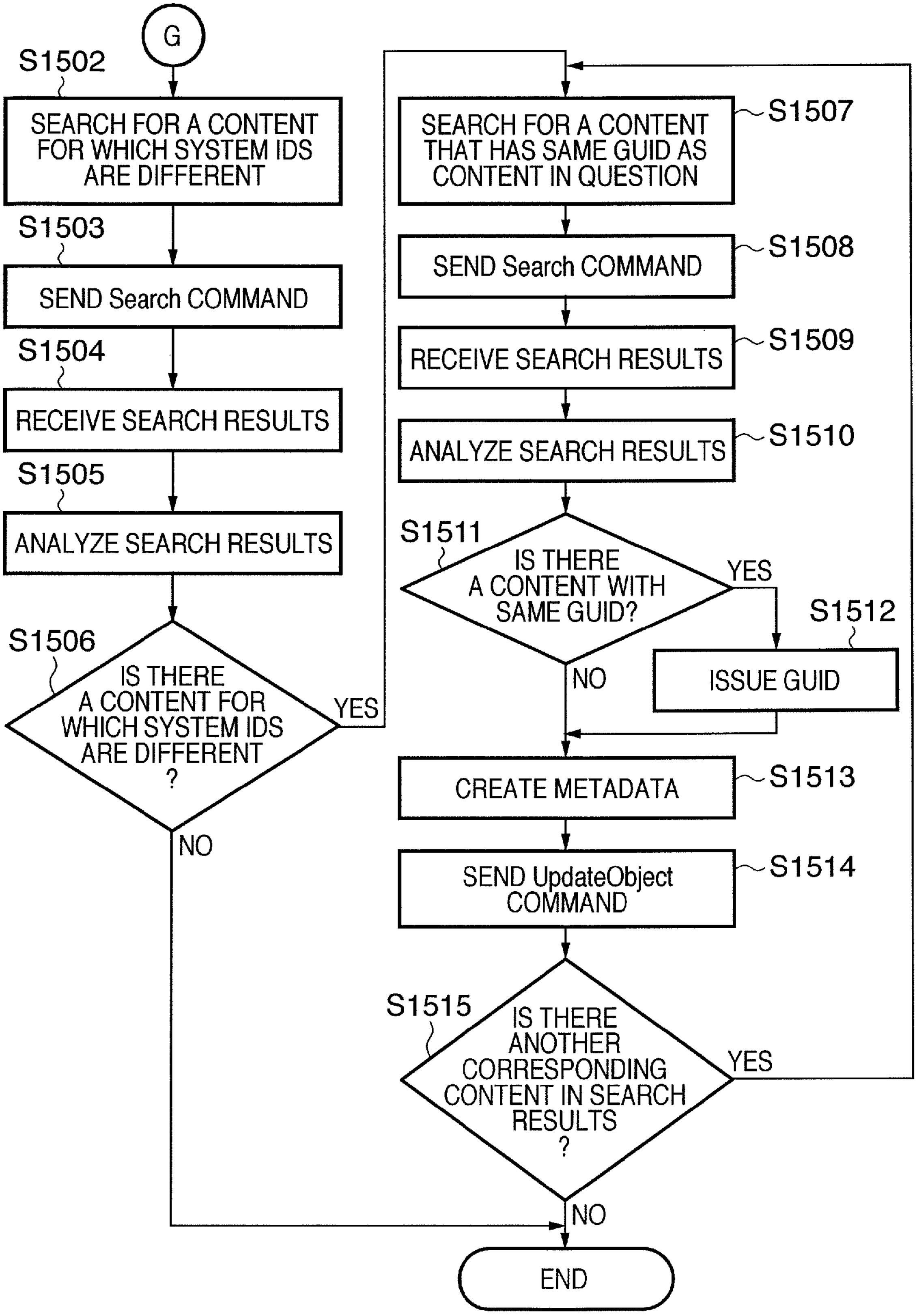
FIG. 14B is a flowchart that shows the operations of a management apparatus according to the embodiment when performing a content operation (registration of new content, moving or copying content)

FIGS. 14A and 14B are flowcharts that describe the processing of the management apparatus 101 when occurrence of an operation with respect to content is detected by notification of a content list change event. According to the present embodiment, processing in the case of the occurrence of new registration, movement, or copying of content is described.

First, the processing of the management apparatus 101 in a case where new content A 701 is registered in the camera device 103*b* by the operation apparatus 102 (FIG. 9) is described. By receiving a content list change event (908) from the camera device 103*b* (step S1401), the content list change detection unit 211 of the management apparatus 101 detects that the content list was changed. Upon detecting a change in a content list, the search control unit 212 searches for content for which the GUID 505 in the system management area 502 is not set. When content for which the GUID 505 is not set is detected, the management apparatus 101 determines that that content is newly registered content. More specifically, the search control unit 212 creates a search condition for searching for content for which an ID is not set in the GUID 505 (step S1402). The search control unit 212 then sends a Search command to the content server that notified the content list change event, for example the camera device 103*b*, through the protocol control unit 204 to execute a search according to the above described search condition (step S1403).

The search control unit 212 of the management apparatus 101 receives a search result from the content server (camera device 103*b*) in response to the Search command, and analyzes that search result (step S1404). In the example shown in FIG. 9, by analyzing a search result (910) from the camera device 103*b* in response to a Search command (909) issued to the camera device 103*b*, it is found that content exists for which a GUID is not set. When there is content for which a GUID is not set (step S1405), the GUID issuing unit 209 issues a GUID for that content (step S1406). The metadata creation/writing unit 208 then records the issued GUID in the system management area 502 inside the metadata. Further, the metadata creation/writing unit 208 sets the UUID of the camera device 103*b* that is registered in the device managing unit 205 and the object ID 501 in the content list of the search result 910 in the UUID 503 and the object ID 504 of the system management area 502. Thus, metadata is created (step S1407). The management apparatus 101 then issues an UpdateObject command (911) to the camera device 103*b* through the protocol control unit 204 to instruct the camera device 103*b* to change the metadata (step S1408). In this connection, the metadata that is updated in step S1407 is that which was acquired as metadata for which there was no GUID as the result of the search according to the Search command.

According to the above processing, a GUID, a UUID, and an object ID can be set in the system management area 502 for newly registered content, thus enabling unique management of the content.

Next, processing by the management apparatus 101 of the present embodiment at the time of a content operation (moving or copying) is described. First, a case in which content D 704 is moved from the camera device 103*b* to the PC 103*d* by the operation apparatus 102 (FIG. 11) is described. According to this movement operation, the PC 103*a* newly possesses the content D 704*a*, and the object ID in the server management area 523 is rewritten by the PC 103*d*. The PC 103*d* then changes the content list and issues a content list change event to the management apparatus 101.

First, the content list change detection unit 211 detects that a content list was changed upon receiving a content list change event (1110) from the PC 103*d*. In response to this detection, according to the above-described steps S1402 to 1405, the search control unit 212 searches for content with no GUID from the device (PC 103*d*) that is the source of the change event notification. Since the case shown in FIG. 11 is not a case of addition of new content, content with no GUID is not searched from the PC 103*d*. In this case, the search control unit 212 also searches for content for which the UUID 503 in the system management area 502 and the UUID of the PC 103*d* are different and/or for which the object ID 501 in the server management area 523 and the object ID 504 in the system management area 502 are different. More specifically, the search control unit 212 creates a search condition that searches for content for which the UUID 503 in the system management area 502 and the UUID of the PC 103*d* are different and/or for which the object ID 501 and the object ID 504 are different (step S1502). The search control unit 212 then issues a Search command (1111) to the PC 103*d* to cause the PC 103*d* to execute a search using the above described search condition (step S1503).

Upon receiving the search result (1112) from the PC 103*d* (step S1504), the search control unit 212 analyzes that search result (step S1505). When content corresponding to the aforementioned search condition exists, the management apparatus 101 determines that the content is content for which a movement or copy operation was performed.

When the management apparatus 101 determines that the content is content for which a movement or copy operation was performed, the search control unit 212 searches whether content that has the same ID as the ID in the GUID 505 exists in the management system. More specifically, the search control unit 212 creates a search condition for the aforementioned search (steps S1506 and S1507), and sends Search commands (1113 and 1114) to all content servers in the system using the protocol control unit 204 (step S1508). Upon receiving the search results (1115 and 1116) from each content server (step S1509), the search control unit 212 analyzes those search results (step S1510). When there is no other content in the system with the identical GUID 505, such as in the case of the content D 704*a*, the search control unit 212 determines that content was moved.

When it is determined that content was moved, the metadata creation/writing unit 208 updates the UUID 503 and the object ID 504 in the system management area 502 of the metadata of the content in question to create metadata (steps S1511 and S1513). More specifically, the UUID of the PC 103*d* registered in the device managing unit 205 and the object ID 501 of the searched content are set as the UUID 503 and the object ID 504. In step S1513, the metadata is created using the metadata obtained as the result of the search by the Search command.

Subsequently, the management apparatus 101 sends an UpdateObject command 1117 to the PC 103*d* from the protocol control unit 204 to instruct the PC 103*d* to change the metadata (step S1514). If any other content that corresponds to the search condition created at step S1502 exists in the search results, the processing from step S1507 is repeated in order, and when no further corresponding content exists the processing ends (step S1515).

As described above, even when content is moved, the consistency of identification information in the system management area 502 of the metadata is maintained. In this connection, when content is moved inside the same content server, since the object IDs differ even though the UUIDs match, the content that was moved can be searched and found by the search operations of steps S1502 to S1505.

Further, since content is deleted from the camera device 103*b* as a result of the movement of content, a content list change event is also notified from the camera device 103*b*. However, content is not found in any of the searches in steps S1402 to S1404 and steps S1502 to S1505. Consequently, the content list change event is determined to be an event caused by deletion of content, and processing relating to metadata is not performed.

Next, processing in a case in which content E 705 is copied from the camera device 103*b* to the PC 103*d* by the operation apparatus 102 (FIG. 10) is described. In this case, the PC 103*d* updates the object ID in the server management area 523 of the metadata of the new content E 705*a*, and sends notification of a content list change event to the management apparatus 101. The steps until the processing that searches for content having the same GUID at step S1510 are the same as those described above. Further, the sequence denoted by reference numerals 1008 to 1014 in FIG. 10 is the same as the sequence denoted by reference numerals 1110 to 1116 in FIG. 11.

In the case of a copy operation, content, such as the content E 705, that has the same GUID 505 as the content E 705*a* exists in the management system. When contents that have the same GUID exist in this manner, it is determined that an operation to copy content was performed, and the GUID issuing unit 209 issues a GUID to be assigned to the content E 705*a* (steps S1511 and S1512). The metadata creation/writing unit 208 then records the newly issued GUID in the system management area 502 inside the metadata of the relevant content, and updates the UUID 503 and the object ID 504 to create metadata (step S1513). In this case, the UUID of the PC 103*d* that is registered in the device managing unit 205 and the object ID 501 of the content acquired by the search are set in the UUID 503 and the object ID 504. Thereafter, the management apparatus 101 issues an UpdateObject command to the PC 103*d* through the protocol control unit 204 (1015, to instruct the PC 103*d* to change the metadata (step S1514).

According to the above processing, even when content was moved between content servers, such as in the case of the content D 704, the data for the GUID 505, the UUID 503 and the object ID 504 is held inside the system management area 502, and the identity of the content can be managed. Further, even when content was copied, such as in the case of the content E 705, by changing the data for the GUID 505, the UUID 503 and the object ID 504 inside the system management area 502, the content can be uniquely managed.

In this connection, similar processing is performed to deal with a case in which content was moved or copied inside the same server, such as the case of the content C 703 or the content F 706 (movement or copying is detected by change of the object ID).

Although according to the present embodiment the management apparatus 101 has been taken to be an independent apparatus, a configuration may be adopted in which a certain content server has the function of the management apparatus 101 and manages the content inside all content servers in the system. In this case, notification setting with respect to changes in the content list inside the content server with the function of the management apparatus 101 need not be performed.

Further, although according to the present embodiment the operation apparatuses 102 execute only operations of the content servers 103, a configuration may also be adopted in which a certain operation apparatus 102 has a function of the management apparatus 101 and manages the content in all the content servers in the system.

Also, although according to the present embodiment, content that was changed is identified by reading metadata, a configuration may also be adopted in which the management apparatus 101 is given management data of all the content.

Further, although one device was used as the management apparatus 101 according to the present embodiment, the management apparatus 101 may be distributed among a plurality of devices. In this case, a "master" management apparatus exists, and if the power of that management apparatus is disconnected or if the management apparatus suffers a failure, the function of a management apparatus that is a "slave" device starts. Furthermore, since information of changed content can be grasped by reading the metadata of the respective management apparatuses, it is not necessary to exchange content management data between the "master" and "slave" management apparatuses.

Furthermore, although according to the present embodiment the management apparatus sets the content servers so as to notify an event when a content list with respect to the content server was changed, a system may also be adopted in which the management apparatus does not make this setting, and instead constantly monitors the content servers.

As described above, according to the present embodiment, even when an arbitrary operation apparatus 102 operates (moves, copies etc.) content of an arbitrary content server in accordance with a communications protocol such as DLNA, the GUID can be uniquely managed. That is, since an external management apparatus recognizes the changed content, grasps the details of the change, and appropriately updates the GUID in accordance with the respective operation such as moving or copying, the content can be uniquely managed.

Further, when an arbitrary content server 103 newly enters the system, the content server 103 and the new content can be recognized from the management apparatus 101, and the content can be uniquely managed. Alternatively, even in a case in which content is newly added to an arbitrary content server, the content server 103 and the new content can be recognized from the external management apparatus, and the content can be uniquely managed.

Thus, according to the above described embodiment, even when an operation by an arbitrary operation apparatus is performed with respect to content inside a plurality of arbitrary content servers provided in a home network, it is possible to maintain the consistency of and uniquely manage the identification information of all content in the system.

Further, since assignment of a GUID is performed by the management apparatus 101, it is also possible to manage content in a content server that does not have the ability to add an arbitrary GUID.

Furthermore, the management apparatus 101 searches for the content that is an operation object with respect to the device that sends a notification of a change in a content list. Therefore, there is no necessity for the management apparatus 101 to hold the metadata of all the content, and there is also no necessity to make all the content in the system a search object in order to find the content that was subjected to an operation. More specifically, even if the management apparatus 101 does not hold the metadata of all the content on the memory, the management apparatus 101 can ascertain which content was changed and the details of the change operation. Further, by performing a search for one part of content, the management apparatus 101 can ascertain which content was changed and the details of the change operation.

Note that the present invention includes a case in which the functions of the foregoing embodiment are accomplished by supplying a software program directly or indirectly to a system or apparatus, reading the supplied program code with a computer of the system or apparatus, and then executing the program code. In this case, the supplied program is a program corresponding to a flowchart shown in a figure according to the embodiment.

Accordingly, since the functional processes of the present invention are implemented by a computer, the program code itself installed in the computer also implements the present invention. In other words, the claims of the present invention also cover a computer program for the purpose of implementing the functional processes of the present invention.

In this case, so long as the system or apparatus has the functions of the program, the program may be executed in any form, for example, as object code, a program executed by an interpreter, or script data supplied to an operating system.

Examples of storage media that can be used for supplying the program are a floppy (registered trademark) disk, a hard disk, an optical disk, a magneto-optical disk, an MO, a CD-ROM, a CD-R, a CD-RW, a magnetic tape, a non-volatile type memory card, a ROM, and a DVD (a DVD-ROM and a DVD-R).

As for the method of supplying the program, a client computer can be connected to a website on the Internet using a browser of the client computer, and the computer program of the present invention can be downloaded from the website to a recording medium such as a hard disk. In this case, a program to be downloaded may be an automatically-installable compressed file of the program. Further, the program of the present invention can be supplied by dividing the program code constituting the program into a plurality of files and downloading the files from different websites. In other words, a WWW (World Wide Web) server that downloads, to multiple users, the program files that implement the functional processes of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiment are implemented by executing the read program by computer, an operating system or the like running on the computer may perform all or a part of the actual processing, based on instructions of the program, so that the functions of the foregoing embodiment can be implemented by this processing.

Furthermore, a part or all of the functions of the foregoing embodiment may be implemented after the program read from the storage medium is written to a function expansion board inserted into the computer or to a memory provided in a function expansion unit connected to the computer. In this case, after the program is written to the function expansion board or function expansion unit, a CPU or the like mounted on the function expansion board or function expansion unit performs all or a part of the actual processing in accordance with the instructions of the program.

According to the present invention, in a content management system that has a plurality of content servers, the consistency of content identification information can be maintained even when a content operation such as copying or moving content occurs. Further, when managing identification information from an apparatus that does not perform a content operation, the consistency of content identification information can be maintained regardless of the occurrence of a content operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-127883, filed May 1, 2006, which is hereby incorporated by reference herein in its entirety.

What is claimed is:

1. A managing apparatus configured to manage contents that are possessed by one or more devices in a system, said managing apparatus comprising:

a first search unit;

a determination unit; and an update unit, wherein to each content is attached attendant information having a first area in which a device that possesses the content in question records first identification information for uniquely identifying the content on the device and a second area in which the managing apparatus records second identification information for uniquely identifying the content in the system and the first identification information that is recorded in the first area, said first search unit being configured to, upon receipt of a notification from a device, which indicates an occurrence of a change in a content list that is managed by the device, search for a content for which the first identification information that is recorded in the first area and the second area, respectively, of the attendant information are different, from among contents that are possessed by the device in question;

said determination unit being configured to determine whether or not the second identification information that is recorded in the second area of the attendant information of the content that is searched for and retrieved by said first search unit is unique among contents in the system; and said update unit being configured to, when said determination unit determines that the second identification information of the attendant information of the content that is retrieved is not unique, update the first identification information that is recorded in the second area of the attendant information with the first identification information that is recorded in the first area of the attendant information, and update the second identification information to identification information that is unique in the system, and when said determination unit determines that the second identification information of the attendant information of the content that is retrieved is unique, update the first identification information that is recorded in the second area of the attendant information with the first identification information that is recorded in the first area of the attendant information without updating the second identification information recorded in the second area, wherein the first identification information of the content is recorded in the first area by the device when the content is newly registered in the device or copied or moved from another device into the device, and wherein the first identification information and the second identification information of the content are recorded in the second area by said managing apparatus when the content is newly registered in the device or copied or moved from another device into the device.

2. The apparatus according to claim 1, wherein third identification information that identifies a device that possesses the corresponding content is further recorded by the managing apparatus in the second area of the attendant information;

said first search unit further searches for a content for which the third identification information that is recorded in the second area of the attendant information is different from an identification information of the device that possesses the corresponding content; and said update unit further updates the third identification information that is recorded in the second area of the attendant information of the content that is searched for and retrieved, with the identification information of the device that possesses the corresponding content.

3. The apparatus according to claim 1, further comprising:

a second search unit configured to search for a content for which the second identification information is not recorded in the second area of the attendant information; and a recording unit configured to record, in the second area of the attendant information of the content that is searched for and retrieved by said second search unit, the first identification information that is recorded in the first area of the attendant information and the second identification information for uniquely identifying the content in the system.

4. The apparatus according to claim 1, wherein said determination unit searches all devices in the system for a content having second identification information that is the same as second identification information that is recorded in the second area of the attendant information of the content that is retrieved, and when corresponding content is found said determination unit determines that the second identification information that is recorded in the second area of the attendant information of the content that is retrieved is not unique.

5. The apparatus according to claim 3, wherein said second search unit begins processing in response to a notification of an event that indicates an occurrence of a change in a content list that is managed by each device.

6. The apparatus according to claim 1, further comprising:

a fourth search unit configured to, upon detection of participation of a new device in the system, search for a content for which the second identification information is not recorded in the second area of the attendant information among contents that are possessed by the new device;

a fifth search unit configured to search among the contents possessed by the new device for a content for which the first identification information that is recorded in the first area and in the second area of the attendant information are different, and also search for a content for which the second identification information that is recorded in the second area of the content that is searched for and retrieved is not unique among all the contents in the system; and an update unit configured to record in the second area of the attendant information of the content that is searched for and retrieved by said fourth search unit, the first identification information that is recorded in the first area of the attendant information and the second identification information for uniquely identifying the content in the system, and to update the first identification information in the second area of the attendant information of the content that is retrieved by said fifth search unit with the first identification information that is recorded in the first area of the attendant information.

7. A managing system, comprising one or more devices and a managing apparatus communicably connected, wherein contents possessed by the devices are managed by the managing apparatus, the managing apparatus comprising:

a first search unit;

a determination unit; and an update unit, wherein, to each content is attached attendant information having a first area in which a device that possesses the content in question records a first identification information for uniquely identifying the content on that device and a second area in which the managing apparatus records a second identification information for uniquely identifying the content in the system and the first identification information that is recorded in the first area;

said first search unit being configured to, upon receipt of a notification from a device, which indicates an occurrence of a change in a content list that is managed by that device, search for a content for which the first identification information that is recorded in the first area and the second area, respectively, of the attendant information are different, from among contents that are possessed by the device in question;

said determination unit being configured to determine whether or not the second identification information that is recorded in the second area of the attendant information of the content that is searched for and retrieved by said first search unit is unique among contents in the system; and said update unit being configured to, when said determination unit determines that the second identification information of the attendant information of the content that is retrieved is not unique, update the first identification information that is recorded in the second area of the attendant information with the first identification information that is recorded in the first area of the attendant information, and update the second identification information to identification information that is unique in the system, and when said determination unit determines that the second identification information of the attendant information of the content that is retrieved is unique, update the first identification information that is recorded in the second area of the attendant information with the first identification information that is recorded in the first area of the attendant information without updating the second identification information recorded in the second area wherein the first identification information of the content is recorded in the first area by the device when the content is newly registered in the device or copied or moved from another device into the device, and wherein the first identification information and the second identification information of the content are recorded in the second area by said managing apparatus when the content is newly registered in the device or copied or moved from another device into the device.

8. A method of managing contents possessed by one or more devices in a system, said method comprising:

a first search step;

a determination step; and an update step, wherein, to each content is attached attendant information having a first area in which a device that possesses the content in question records a first identification information for uniquely identifying the content on the device, and a second area in which the managing apparatus records a second identification information for uniquely identifying the content in the system and the first identification information that is recorded in the first area;

said first search step being a step of, when a notification from a device, which indicates an occurrence of a change in a content list that is managed by the device is received from a device, searching for a content for which the first identification information that is recorded in the first area and the second area, respectively, of the attendant information are different, from among contents that are possessed by the device in question;

said determination step being a step of determining whether or not the second identification information that is recorded in the second area of the attendant information of the content that is searched for and retrieved in said first search step is unique among contents in the system; and said update step being a step of, when it is determined in the determination step that the second identification information of the attendant information of the content that is retrieved is not unique, updating the first identification information that is recorded in the second area of the attendant information using the first identification information that is recorded in the first area of the attendant information, and updating the second identification information to identification information that is unique in the system, and when it is determined in the determination step that the second identification information of the attendant information of the content that is retrieved is unique, updating the first identification information that is recorded in the second area of the attendant information with the first identification information that is recorded in the first area of the attendant information without updating the second identification information recorded in the second area, wherein the first identification information of the content is recorded in the first area by the device when the content is newly registered in the device or copied or moved from another device into the device, and wherein the first identification information and the second identification information of the content are recorded in the second area by said managing apparatus when the content is newly registered in the device or copied or moved from another device into the device.

9. A non-transitory computer-readable storage medium storing a control program for executing a content managing method by means of a computer, said method being a method of managing contents possessed by one or more devices in a system, and said method comprising:

a first search step;

a determination step; and an update step, wherein, to each content is attached attendant information having a first area in which a device that possesses the content in question records a first identification information for uniquely identifying the content on the device, and a second area in which the managing apparatus records a second identification information for uniquely identifying the content in the system and the first identification information that is recorded in the first area;

said first search step being a step of, when a notification from a device, which indicates an occurrence of a change in a content list that is managed by the device is received from a device, searching for a content for which the first identification information that is recorded in the first area and the second area, respectively, of the attendant information are different, from among contents that are possessed by the device in question;

said determination step being a step of determining whether or not the second identification information that is recorded in the second area of the attendant information of the content that is searched for and retrieved in said first search step is unique among contents in the system; and said update step being a step of, when it is determined in the determination step that the second identification information of the attendant information of the content that is retrieved is not unique, updating the first identification information that is recorded in the second area of the attendant information using the first identification information that is recorded in the first area of the attendant information, and updating the second identification information to identification information that is unique in the system, and when it is determined in the determination step that the second identification information of the attendant information of the content that is retrieved is unique, updating the first identification information that is recorded in the second area of the attendant information with the first identification information that is recorded in the first area of the attendant information without updating the second identification information recorded in the second area, wherein the first identification information of the content is recorded in the first area by the device when the content is newly registered in the device or copied or moved from another device into the device, and wherein the first identification information and the second identification information of the content are recorded in the second area by said managing apparatus when the content is newly registered in the device or copied or moved from another device into the device.

* * * * *